(12) United States Patent
Prokop

(10) Patent No.: US 6,929,434 B2
(45) Date of Patent: Aug. 16, 2005

(54) ROTARY CUTTING TOOL

(75) Inventor: Hermann F. Prokop, Neustadt an der Aisch (DE)

(73) Assignee: Kennametal Inc., Latrobe, PA (US)

( * ) Notice: Subject to any disclaimer, the term of this patent is extended or adjusted under 35 U.S.C. 154(b) by 104 days.

(21) Appl. No.: 10/356,317

(22) Filed: Jan. 31, 2003

(65) Prior Publication Data

US 2003/0175085 A1 Sep. 18, 2003

(30) Foreign Application Priority Data

Feb. 1, 2002 (DE) .......................................... 102 04 105

(51) Int. Cl.[7] .............................................. B23B 51/02
(52) U.S. Cl. ..................................... 408/230; 408/224
(58) Field of Search ................................ 408/223–225, 408/227, 229, 230; B23B 51/02

(56) References Cited

U.S. PATENT DOCUMENTS

| | | | | |
|---|---|---|---|---|
| 116,837 A | * | 7/1871 | Kelly | ......................... 408/224 |
| 3,443,459 A | | 5/1969 | Mackey et al. | |
| 3,977,807 A | | 8/1976 | Siddall | |
| 4,231,693 A | * | 11/1980 | Kammeraad | ................ 408/230 |
| 4,558,975 A | | 12/1985 | Hale | |
| 4,605,347 A | | 8/1986 | Jodock et al. | |
| 5,234,294 A | * | 8/1993 | Hoppe et al. | ................. 408/67 |
| 5,354,156 A | | 10/1994 | von Haas et al. | |
| 5,509,761 A | | 4/1996 | Grossman et al. | |
| 5,688,083 A | | 11/1997 | Boianjiu | |
| 5,800,100 A | | 9/1998 | Krenzer | |
| 5,823,720 A | * | 10/1998 | Moore | ........................ 408/204 |
| 5,829,927 A | | 11/1998 | Nakamura et al. | |
| 5,890,853 A | | 4/1999 | Hiranaka | |
| 5,967,710 A | | 10/1999 | Krenzer | |
| 5,967,712 A | | 10/1999 | Magill et al. | |
| 5,971,674 A | * | 10/1999 | Holley | ........................ 408/59 |
| 6,145,606 A | | 11/2000 | Haga | |
| 6,164,879 A | | 12/2000 | Krenzer | |
| 6,238,151 B1 | | 5/2001 | Takagi | |
| 6,315,064 B1 | | 11/2001 | Massa et al. | |

FOREIGN PATENT DOCUMENTS

| | | | | |
|---|---|---|---|---|
| DE | 89 01 319.0 | | 5/1989 | |
| DE | 40 26 603 A1 | | 4/1991 | |
| DE | 42 36 824 C2 | | 11/1993 | |
| DE | 299 19 858 U 1 | | 5/2000 | |
| EP | 0 137 898 | | 4/1985 | |
| EP | 0 901 860 A1 | | 3/1999 | |
| GB | 1368270 A | * | 9/1974 | ........... B23B/51/08 |
| GB | 2 085 769 A | | 5/1982 | |
| JP | 63-260713 | * | 10/1988 | ........... B23B/51/02 |
| JP | 04041113 A | * | 2/1992 | ........... B23B/51/00 |
| JP | 04275813 A | * | 10/1992 | ........... B23B/51/00 |
| WO | WO 00/21704 A1 | | 4/2000 | |

* cited by examiner

*Primary Examiner*—Daniel W. Howell
(74) *Attorney, Agent, or Firm*—Nils H. Ljungman & Associates

(57) ABSTRACT

There is now provided a rotary cutting tool, particularly a drill, that has at least two cutting edges that respectively comprise a main cutting edge and that respectively are disposed, particularly symmetrically, with respect to the central axis of a cutter portion, whereby the radius of the main cutting edges is less than the maximal cutting edge radius of the cutter portion. A secondary cutting edge is associated with a main cutting edge, this secondary cutting edge is curvilinear in at least a portion and is configured as smooth finishing cutting edge, this secondary cutting edge comprises a plurality of curve-forming radii, whereby in an outer smooth finishing region within the region of the maximal cutting edge radius, the curve-forming radius of the smooth finishing cutting edge is greater than the maximal cutting edge radius. The cutter portion that is adjacent to the outer smooth finishing region is tapered by a taper that diminishes the size in the direction away from the main cutting edges.

20 Claims, 10 Drawing Sheets

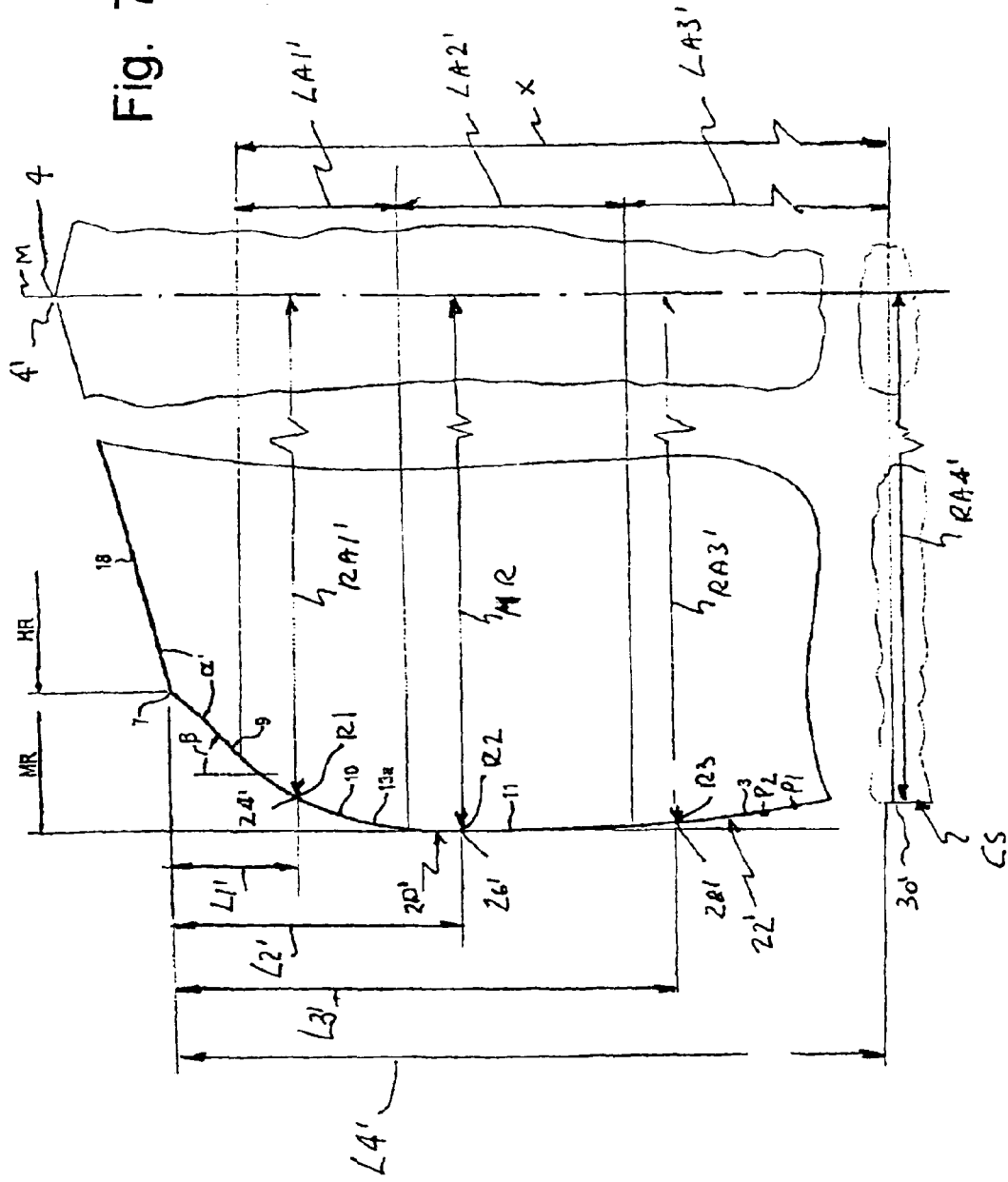

ROTARY CUTTING TOOL

BACKGROUND OF THE INVENTION

1. Field of the Invention

This invention relates to a rotary cutting tool, for example, a drill, such as, for example, a twist drill, a wiper twist drill, a drill with straight flutes, a countersink tool, or a reaming tool, that has at least two cutting edges, said cutting edges respectively comprising a main cutting edge, and said cutting edges being disposed, particularly symmetrically, with respect to the central axis of a cutter portion.

2. Background Information

Such a rotary cutting tool that is configured as a drill is known, for example, from International Patent Publication No. WO 01/76794 A1. That drill comprises a plurality of cutting edges that are produced either by grinding of the tip structure of the drill per se, or the cutting edges are portions of a cutting insert. The cutting edges are limited by so-called noses that are disposed at the outer edges of the cutting edges, said noses having several radii of curvature. By means of such rounded noses the hole that is being produced is to attain a good surface quality. It is furthermore suggested that a high cutting speed during drilling of metal can be attained. During drilling, however, there arises the danger of a nose that forms a portion of each cutting edge breaking away. International Patent Publication No. WO 01/76794 is hereby incorporated by reference as if set forth in its entirety herein.

OBJECT OF THE INVENTION

The object of the invention is to provide a rotary cutting tool that is particularly mechanically stable, particularly a drill, said tool ensuring, in a single operation, a high chip forming productivity and a smooth finishing operation that provides a very good surface quality.

SUMMARY OF THE INVENTION

The invention teaches that this object can be accomplished by a twist drill configured to drill a hole in metal object, said twist drill comprising: a shaft portion configured to retain said twist drill for drilling; a cutting portion disposed adjacent said shaft portion; said cutting portion comprising a tip portion and a fluted portion; said tip portion being configured to drill a hole having a first diameter in a metal object; said tip portion comprising at least one chisel edge; each said at least one chisel edge comprising a first end and a second end; said shaft portion and said cutting portion defining a central longitudinal axis disposed through said shaft portion and said cutting portion; at least one coolant channel, open at said tip portion, being configured to pass a coolant to lubricate and cool at least said tip portion; each said at least one coolant channel extending through said shaft portion and said cutting portion; said first chisel edge end being disposed closer to said central longitudinal axis than said second chisel edge end; said fluted portion being disposed between said tip portion and said shaft portion; said fluted portion comprising a cutting edge configured to drill a hole having a final diameter; said final diameter hole being greater than said first diameter hole drilled by said tip portion of said twist drill; said fluted cutting edge comprising a first cutting edge portion and a second cutting edge portion or edge portion; said first cutting edge portion comprising a first cutting edge area, a second cutting edge area, and a third cutting edge area; said second cutting edge portion comprising a fourth cutting edge area or edge area; said fourth cutting edge area or edge area being disposed within a cylindrical surface; said first cutting edge area being disposed at a first distance measured along said central longitudinal axis from said tip portion; said second cutting edge area being disposed at a second distance measured along said central longitudinal axis from said tip portion; said third cutting edge area being disposed at a third distance measured along said central longitudinal axis from said tip portion; said fourth cutting edge area or edge area being disposed at a fourth distance measured along said central longitudinal axis from said tip portion; said second longitudinal distance being greater than said first longitudinal distance; said third longitudinal distance being greater than said second longitudinal distance; said fourth longitudinal distance being greater than said third longitudinal distance; said first cutting edge area being disposed at a first distance from said central longitudinal axis; said first distance being measured radially from said central longitudinal axis; said second cutting edge area being disposed at a second distance (MR) from said central longitudinal axis; said second distance (MR) being measured radially from said central longitudinal axis; said third cutting edge area being disposed at a third distance from said central longitudinal axis; said third distance being measured radially from said central longitudinal axis; said second chisel edge end of said tip portion being disposed at a distance (HR) from said central longitudinal axis; said distance (HR) of said second chisel edge end being measured radially from said central longitudinal axis; said second radial distance (MR), of said second cutting edge area, being greater than all of (i.), (ii.), and (iii.), wherein (i.), (ii.),and (iii.) are: (i.) said first radial distance, of said first cutting edge area; (ii.) said third radial distance, of said third cutting edge area; and; (iii.) said radial distance (HR), of said second chisel edge end of said tip portion; at least one of said first cutting edge area, said second cutting edge area, and said third cutting edge area comprising a curved portion; said curved portion comprising at least a first point and a second point, said second point being disposed further away from said central longitudinal axis than said first point; said first cutting edge area having a first length measured along said central longitudinal axis; said second cutting edge area having a second length measured along said central longitudinal axis; said third cutting edge area having a third length measured along said central longitudinal axis; the sum of the lengths of said first cutting edge area, said second cutting edge area, and said third cutting edge area being substantially greater than the difference between said second radial distance (MR), of said second cutting edge portion, and said radial distance (HR), of said second chisel edge end, of said tip portion; the twist drill comprising a first twist drill; said first cutting edge portion of said first twist drill being configured to drill a hole with a smoother surface finish than a hole drilled by an equivalent twist drill; the equivalent twist drill having a tip portion: identical to said tip portion of said first twist drill; and a first equivalent cutting edge portion, the first equivalent cutting edge portion having a first equivalent cutting edge area, a second equivalent cutting edge area, and a third equivalent cutting edge area; the first equivalent cutting edge area being disposed at a first distance measured along a central longitudinal axis from the tip portion of the equivalent twist drill; the second equivalent cutting edge area being disposed at a second distance measured along the central longitudinal axis of the equivalent twist drill; the third equivalent edge area being disposed at a third distance measured along the central longitudinal axis of the equivalent twist drill; the first equivalent cutting edge area being disposed at a first distance from the central longitudinal axis of the equivalent twist drill measured radially from the central longitudinal axis of the equivalent twist drill; the second equivalent cutting edge area being disposed at a second distance from the central longitudinal axis of the equivalent twist drill measured radially from the central longitudinal axis of the equivalent twist drill; the third equivalent cutting edge area being disposed at a third distance from the central longitudinal axis of the equivalent twist drill measured radially from the central longitudinal axis of the equivalent twist drill; the first radial distance, the second radial distance, and the third radial distance, of the equivalent twist drill, all being equal so that the first cutting edge area, the second cutting edge area, and the third cutting edge area, of the equivalent twist drill, all lie wholly within the same cylindrical surface.

The invention also teaches that the object can be accomplished by a method of cutting an orifice with a rotary cutting tool, such as, a twist drill, a wiper twist drill, a drill with straight flutes, a reamer, and a countersink, said rotary cutting tool comprising: a cutting portion; said cutting portion comprising a tip portion and a fluted portion; said tip portion being configured to cut an orifice having a first diameter in an object to be cut; said cutting portion defining a central longitudinal axis disposed through said cutting portion; said fluted portion comprising a cutting edge configured to cut an orifice having a final diameter; said final diameter orifice being greater than said first diameter orifice cut by said tip portion of said rotary cutting tool; said fluted cutting edge comprising a first edge portion and a second edge portion; said first edge portion comprising a first edge area, a second edge area, and a third edge area; said first edge area being disposed at a first distance measured along said central longitudinal axis from said tip portion; said second edge area being disposed at a second distance measured along said central longitudinal axis from said tip portion; said third edge area being disposed at a third distance measured along said central longitudinal axis from said tip portion; said second longitudinal distance being greater than said first longitudinal distance; said third longitudinal axis being greater than said second longitudinal distance; said fourth longitudinal distance being greater than said third longitudinal distance; said first edge area being disposed at a first distance from said central longitudinal axis; said first distance being measured radially from said central longitudinal axis; said second edge area being disposed at a second distance from said central longitudinal axis; said second distance being measured radially from said central longitudinal axis; said third edge area being disposed at a third distance from said central longitudinal axis; said third distance being measured radially from said central longitudinal axis; said tip portion comprising a peripheral area; said peripheral area being disposed at a distance (HR) being measured radially from said central longitudinal axis; said second radial distance (MR) of said second edge area, being greater than all of (i.), (ii.), and (iii.), wherein (i.), (ii.), and (iii.) are: (i.) said first radial distance, of said first edge area; (ii.) said third radial distance, of said third edge area; and (iii.) said radial distance (HR), of said tip portion; said first edge area having a first length measured along said central longitudinal axis; said second edge area having a second length measured along said central longitudinal axis; said third edge portion having a third length measured along said central longitudinal axis; the sum of the lengths of said first edge area, said second edge area, and said third edge area being substantially greater than the difference between said second radial distance (MR), of said second edge area, and said radial distance (HR), of said tip portion; said rotary cutting tool comprising a first rotary cutting tool; said first edge portion of said first rotary cutting tool being configured to cut an orifice having a smoother surface finish than an orifice cut by an equivalent rotary cutting tool; the equivalent rotary cutting tool having a tip portion: identical to said tip portion of said first rotary cutting tool, and a first equivalent edge portion, the first equivalent edge portion having a first equivalent edge area, a second equivalent edge area, and a third equivalent edge area; the first equivalent edge area being disposed at a first distance measured along a central longitudinal axis from the tip portion of the equivalent rotary cutting tool; the second equivalent edge area being disposed at a second distance measured along the central longitudinal axis of the equivalent rotary cutting tool; the third equivalent edge area being disposed at a third distance measured along the central longitudinal axis of the equivalent rotary cutting tool; the first equivalent edge area being disposed at a first distance from the central longitudinal axis of the equivalent twist drill measured radially from the central longitudinal axis of the equivalent rotary cutting tool; the second equivalent edge area being disposed at a second distance from the central longitudinal axis of the equivalent twist drill measured radially from the central longitudinal axis of the equivalent rotary cutting tool; the third equivalent edge area being disposed at a third distance from the central longitudinal axis of the equivalent twist drill measured radially from the central longitudinal axis of the equivalent rotary cutting tool; the first radial distance, the second radial distance, and the third distance, of the equivalent rotary cutting tool, all being equal so that the first edge area, the second edge area, and the third edge area, of the equivalent rotary cutting tool, lie within the same cylindrical surface; said method comprising the steps of: cutting an orifice having a first diameter in an object being cut with said tip portion; subsequently cutting, with said first edge portion, an orifice and thus producing a final predetermined diameter in the object being cut; said subsequent cutting comprising cutting an orifice, in the object being cut, and producing, by an enhanced, greater, chip forming capacity, a smoother surface finish on said orifice than an equivalent orifice cut in an equivalent object by the equivalent rotary cutting tool; and removing said first rotary cutting tool from the object being cut.

The invention also teaches that the object can be accomplished by a rotary cutting tool, such as, a twist drill, a wiper twist drill, a drill with straight flutes, a reamer, and a countersink, said rotary cutting tool comprising: a cutting portion; said cutting portion comprising a tip portion and a fluted portion; said tip portion being configured to cut an orifice having a first diameter in an object to be cut; said cutting portion defining a central longitudinal axis disposed through said cutting portion; said fluted portion comprising a cutting edge configured to cut an orifice having a final diameter; said final diameter orifice being greater than said first diameter orifice cut by said tip portion of said rotary cutting tool; said fluted cutting edge comprising a first edge portion and a second edge portion; said first edge portion comprising a first edge area, a second edge area, and a third edge area; said first edge area being disposed at a first distance measured along said central longitudinal axis from said tip portion; said second edge area being disposed at a second distance measured along said central longitudinal axis from said tip portion; said third edge area being disposed at a third distance measured along said central longitudinal axis from said tip portion; said second longitudinal distance being greater than said first longitudinal distance; said third longitudinal distance being greater than said second longitudinal distance; said fourth longitudinal distance being greater than said third longitudinal distance; said first edge area being disposed at a first distance from said central longitudinal axis; said first distance being measured radially from said central longitudinal axis; said second edge area being disposed at a second distance from said central longitudinal axis; said second distance being measured radially from said central longitudinal axis; said third edge area being disposed at a third distance from said central longitudinal axis; said third distance being measured radially from said central longitudinal axis; said tip portion comprising a peripheral area; said peripheral area being disposed at a distance (HR) being measured radially from said central longitudinal axis; said second radial distance (MR), of said second edge area, being greater than all of (i.), (ii.), and (iii.), wherein (i.), (ii.), and (iii.) are: (i.) said first radial distance, of said first edge area; (ii.) said third radial distance, of said third edge area; and (iii.) said radial distance (HR), of said tip portion; said first edge area having a first length measured along said central longitudinal axis; said second edge area having a second length measured along said central longitudinal axis; said third edge portion having a third length measured along said central longitudinal axis; the sum of the lengths of said first edge area, said second edge area, and said third edge area being substantially greater than the difference between said second radial distance (MR), of said second edge area, and said radial distance (HR), of said tip portion; said rotary cutting tool comprising a first rotary cutting tool; and said first edge portion of said first rotary cutting tool being configured to cut an orifice having a smoother surface finish than an orifice cut by an equivalent rotary cutting tool; the equivalent rotary cutting tool having a tip portion: substantially identical to said tip portion of said first rotary cutting tool, and a first equivalent edge portion, the first equivalent edge portion having a first equivalent edge area, a second equivalent edge area, and a third equivalent edge area; the first equivalent edge area being disposed at a first distance measured along a central longitudinal axis from the tip portion of the equivalent rotary cutting tool; the second equivalent edge area being disposed at a second distance measured along the central longitudinal axis of the equivalent rotary cutting tool; the third equivalent edge area being disposed at a third distance measured along the central longitudinal axis of the equivalent rotary cutting tool; the first equivalent edge area being disposed at a first distance from the central longitudinal axis of the equivalent twist drill measured radially from the central longitudinal axis of the equivalent rotary cutting tool; the second equivalent edge area being disposed at a second distance from the central longitudinal axis of the equivalent twist drill measured radially from the central longitudinal axis of the equivalent rotary cutting tool; the third equivalent edge area being disposed at a third distance from the central longitudinal axis of the equivalent twist drill measured radially from the central longitudinal axis of the equivalent rotary cutting tool; the first radial distance, the second radial distance, and the third distance, of the equivalent rotary cutting tool, all being equal so that the first edge area, the second edge area, and the third edge area, of the equivalent rotary cutting tool, all lie within the same cylindrical surface.

The invention also teaches that the object can be accomplished in that a plurality of cutting edges of a rotary cutting tool, particularly a drill, respectively comprise a main cutting edge. Furthermore, there is contemplated at least one secondary cutting edge that is configured as smooth finishing cutting edge, said secondary cutting edge being associated with the main cutting edge, but not necessarily being disposed immediately adjacent to the main cutting edge. The main cutting edge does not cover the entire diameter of the cutter portion that carries the main cutting edges and the secondary cutting edges, whereby the diameter of the cutter portion, in the case of a drill, corresponds to the diameter of the hole. The cutter portion of the rotary cutting tool has the greatest diameter in the so-called exterior smooth finishing portion of the secondary cutting edge. Next to this, that is, in the direction of the chucking end of the tool, the tool is configured to be diminished in a taper. In order to produce a particularly high surface quality, the secondary cutting edge is curved in such a way that the radius of curvature in the region of the maximal diameter of the cutter portion is as least as large as the maximal cutting edge radius at such location, which, in the case of a drill, corresponds to the radius of the hole. Particularly the secondary cutting edge may be configured with a portion that is approximately or fully straight, over a portion of the length of the secondary cutting edge in the region of the maximal cutting edge radius. When such a straight portion of the secondary cutting edge in the region of the maximal cutting edge radius is employed, the length of the straight cutting edge portion is preferably twice the amount of the advance feed of the rotary cutting tool.

It is preferred that the radius of curvature of the secondary cutting edge, adjacent the exterior smooth finishing region, transitions into a smaller radius of curvature, either in the direction towards the main cutting edges, or also in the opposite direction, that is, in the direction of the chucking end. The transition of the radii of curvature can hereby be a continuous transition, particularly an especially even transition between neighboring radii of curvature will thereby be given that the secondary cutting edge is configured as an elliptical curve.

In at least one aspect, the invention is based on the consideration that for effectuating a good surface quality in the process step of smooth finishing during chip forming treatment, a cutting edge configuration with a slightly curved edge is advantageous. With such a cutting edge configuration there are nearly completely prevented particularly grooves in the surface that is to be produced. Cutting edges having a curved edge are used, for example, in the case of cutting plates that are used in a lathe.

A further consideration in the configuration of cutting tools comprises the cutting forces that need to be controlled. In order to ensure low cutting forces, in customary drills the transition from the main cutting edge to the respectively adjacent edge of the cutter portion is commonly configured as a sharp corner. However, this has, aside from the disadvantage of configuring a surface of diminished quality, particularly also the disadvantage of rapid wear of the drill and a slight damage in the region of the cutting edge corner. Even in the case of a cutting insert for a drill with prominent rounded configuration of the outer edge, that is, the edge located at the extremity of the drill as is known, for example, from International Patent Publication No. WO 00/21704 A1, the radii of the cutting edge, when compared to the radius of the hole, are relatively small. Thus, in this case for a hole diameter of 13 millimeters to 18 millimeters a greatest edge radius of 1.6 millimeters to 4.0 millimeters is provided, which corresponds to a ratio of cutting edge radius to radius of the hole of 0.25 to 0.44. With such cutting edge configuration there arises, particularly at high advance feed rates, a substantial risk of portions of the cutting edge breaking away in the region of the corner thereof. U.S. Patent Application Publication No. 2001/0033779 published on Oct. 25, 2001, corresponds to International Patent Publication No. WO 00/21704. U.S. Patent Application Publication No. 2001/0033779 published on Oct. 25, 2001, and International Patent Publication No. WO 00/21704 are hereby incorporated by reference as if set forth in their entirety herein.

The cutting edge configuration of the rotary cutting tool according to one embodiment of the invention, that is also referred to as re-boring tool or, for short, as cutting tool, the mentioned problems with tools according to the state of the art are prevented. The main chip producing effort is provided by the main cutting edges that do not cover the full diameter of the hole that is being produced. The surface quality produced by the main cutting edges is not relevant, since subsequent machining is done by the smooth finishing cutting edge. This smooth finishing cutting edge produces a smooth surface using a low chip forming effort. Since the cross-section of the chip that is produced by the smooth finishing cutting edge, or secondary cutting edge, is small, only relatively minor cutting forces act on the secondary cutting edge. This provides a further advantage in that the secondary cutting edge is subjected to less wear. The configuration of the main cutting edges can correspond, at least to a large extent, excepting the edge portion at the drill, to the customary cutting edge configuration in rotary cutting tools, particularly drills, as is known, for example, from Federal Republic of Germany Patent Publication No. 28 51 183 A1. Federal Republic of Germany Patent publication No. 28 51 183 A1 is hereby incorporated by reference as if set forth in its entirety herein.

So as to practically completely prevent the risk of breakage of material in the corner region of a cutting edge, adjacent to the main cutting edge, there is provided a smooth finishing cutting edge that embraces with the main cutting edge a preferably obtuse transition angle of from at least 140 degrees to maximally 179 degrees. When, in accordance with an alternative embodiment, the smooth finishing cutting edge is not adjacent to the associated main cutting edge, but at another corner or surface, for example, the free flank surface of the main cutting edge, the transition angle is provided by the angle between the smooth finishing cutting edge and that corner, or surface, respectively, that is adjacent to the cutting corner, in the direction of the tip of the cutting tool. The corner radius that prevails in the transition region between the main cutting edge or, respectively other edges or surfaces, particularly free flank surfaces, and secondary cutting edges next thereto, are not relevant for the surface quality that can be attained, since the material that is to be removed as chips is fully removed in this region. This results therefrom that the main cutting edge radius is less than the processing radius, particularly the hole radius, that is determined by the smooth finishing cutting edges. In the transition region between the main cutting edge and the adjacent secondary cutting edge, there may be provided a protective land or chamfer, by means of which the risk of damage of the rotary cutting tool at this location is further diminished. The protective land or chamfer does not negatively contribute to the surface quality that can be attained.

Despite the large transition angle between the main cutting edge and the secondary cutting edge, the tip angle can be 120 degrees, and thus be similarly large as in customary rotary tools, for example, corresponding to a drill according to Federal Republic of Germany Patent Publication No. 28 51 183 A1 referred to above. This is achieved thereby that the main cutting edges do not account for the entire processing diameter, particularly the diameter of the hole. Rather, a portion of the material to be worked is removed within the processing diameter by the smooth finishing cutting edges. The smooth finishing cutting edges in this are curved in such a way that they extend, in the exterior smooth finishing region that determines the processing diameter, parallel to the central axis, or at the surface of a cylinder extending symmetrically to the central axis, and are curved in the direction towards the main cutting edges and also in opposite direction in the direction of the central axis. In this, the curvature of the smooth finishing cutting edges in the direction towards the main cutting edges, that is, in the direction of the tip of the tool, is configured more prominently than in the opposite direction, that is, in the direction towards the chucking end of the rotary cutting tool. The chucking end per se, that is, the portion of the rotary cutting tool that is to provided so as to be retained in a chuck, can in customary manner again be configured with a larger diameter than that portion which comprises the cutting edges, i.e., main cutting edges and smooth finishing cutting edges, this forward portion being referred to as the cutter portion of the tool. Federal Republic of Germany Patent Publication 28 51 183 corresponds to U.S. Pat. No. 4,222,690 issued on Sep. 16, 1980 to Hosoi and entitled "Drill having cutting edges with the greatest curvature at the central portion thereof," and U.S. Pat. No. 4,381,162 issued on Apr. 26, 1983 to Hosoi and entitled "Drill having cutting edges with the greatest curvature at the central portion thereof." Federal Republic of Germany Patent Publication 28 51 183 and U.S. Pat. Nos. 4,222,690 and 4,381,162 are hereby incorporated by reference as if set forth in their entirety herein.

In accordance with a preferred embodiment, a sharpening-finishing grinding, or sharpening regrinding, of the main cutting edges is possible with less effort thereby that there is respectively provided an axial cutting edge portion that is adjacent to the individual main cutting edges. The axial cutting edge portion is not important, neither for the attainable surface quality, as long as it is parallel to the central axis of the rotary cutting tool, nor for the chip production effort. A partial wear-grinding of the axial cutting edge portion does not affect the properties of the rotary cutting tool in any relevant manner. The transition angle between the main cutting edge and the axial cutting edge portion preferably has the value of at least 110 degrees and maximally 121 degrees. The transition region between the main cutting edge and the axial cutting edge portion can be configured like a sharp edge, with a corner radius and/or with a protective land or chamfer, in analogous manner to the transition region between the main cutting edge and the smooth finishing cutting edge in the case of a rotary cutting tool without axial cutting edge portion.

The axial portion that is next to the main cutting edge separates the main cutting edge from the associated secondary cutting edge. In this, the secondary cutting edge may be offset in relation to the main cutting edge at the circumference of the rotary cutting tool. By means of this separation of the main cutting edge and the secondary cutting edge, two separate chips are produced upon chip producing processing, this applies to the case with an offset or without an offset of the cutting edges at the tool circumference. While the main cutting edge produces the main cutting pressure, the smooth finishing cutting edge or secondary cutting edge, is responsible for the high surface quality that can be attained. The chip division has, aside from this advantage of defined separation during the one-step processing of rough finishing and smooth finishing, the further advantage of an easier chip removal when compared with customary processing in which a single chip occupies the entire processing radius.

The length of the axial cutting edge portion is accordance with a preferred embodiment is less when compared to the maximal cutting edge radius of the rotary cutting tool that corresponds to the processing radius, particularly it is less than 40% of the maximal cutting edge radius. This is sufficient for sharpening-finishing grinding, or sharpening regrinding; simultaneously there is attained nearly in the entire processing depth along the rotary cutting tool, a constant processing diameter in the workpiece that is to be treated.

In the case of a rotary cutting tool that is configured either with or without an axial cutting edge portion, the maximal secondary cutting angle, that is, the maximal angle of the smooth finishing cutting edge, or secondary cutting edge, in relation to the central axis, is preferably at least 30 degrees and maximally 60 degrees, particularly 45 degrees. In this, no consideration is given to the transition between the main cutting edge and the secondary cutting edge.

The smooth finishing cutting edges merely remove a small and defined chip from the workpiece that is being processed, whereas the main cutting edges carry out the high chip production effort. A high surface quality produced by the smooth finishing cutting edges with accompanying high chip production effort is preferably produced thereby that the main cutting edge radius is at least 90%, and maximally 98%, of the maximal cutting edge radius.

So as not to diminish the high surface quality obtained during processing by portions that are disposed to the rear, i.e., portions remote from the main cutting edges of the rotary cutting tool, the diameter of the cutter portion becomes more slender adjacent to the exterior smooth finishing portion, that is, in the direction away from the main cutting edges. This provides the further advantage that thermally induced dimensional variations of the tool during processing only affect the attainable surface quality to a small amount.

In accordance with a preferred embodiment, the rotary cutting tool comprises, in addition to the main cutting edges, at least one secondary cutting edge that is also referred to as friction cutting, or reaming, edge, without a main cutting edge being present adjacent thereto. It is preferred that the amount of the friction cutting, or reaming, edges is equal to the amount of main cutting edges. The friction cutting, or reaming, edge performs the finishing processing of the surface being produced, particularly the surface of a hole, and for this purpose the friction cutting, or reaming, edge has, in reference to the rotary cutting tool, the greatest distance from the central axis. The processing diameter, accordingly, is determined by the friction cutting, or reaming, edge. This embodiment of the rotary cutting tool is particularly suited for materials producing short chips, for example, cast materials.

The above-discussed embodiments of the present invention will be described further hereinbelow. When the word "invention" is used in this specification, the word "invention" includes "inventions", that is the plural of "invention". By stating "invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

The invention is explained in greater detail below with reference to the embodiments which are illustrated in the accompanying drawings.

FIG. 7A is a diagram of the forward cutting edge of the rotary cutting tool in accordance with FIG. 4;

DESCRIPTION OF THE PREFERRED EMBODIMENTS

In all figures corresponding components are identified with the same reference designations.

Figures 1, 2:
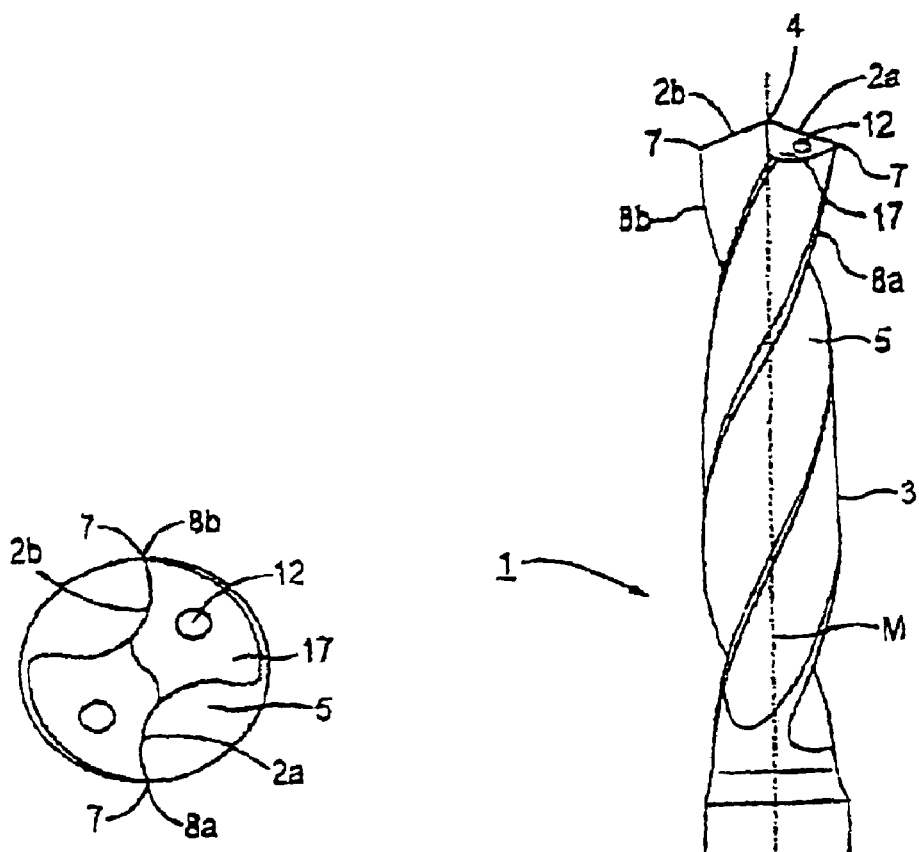
FIG. 1 shows a rotary cutting tool configured as a drill.
FIG. 2 is a top plan view of the rotary cutting tool according to FIG. 1.
Figure 3:
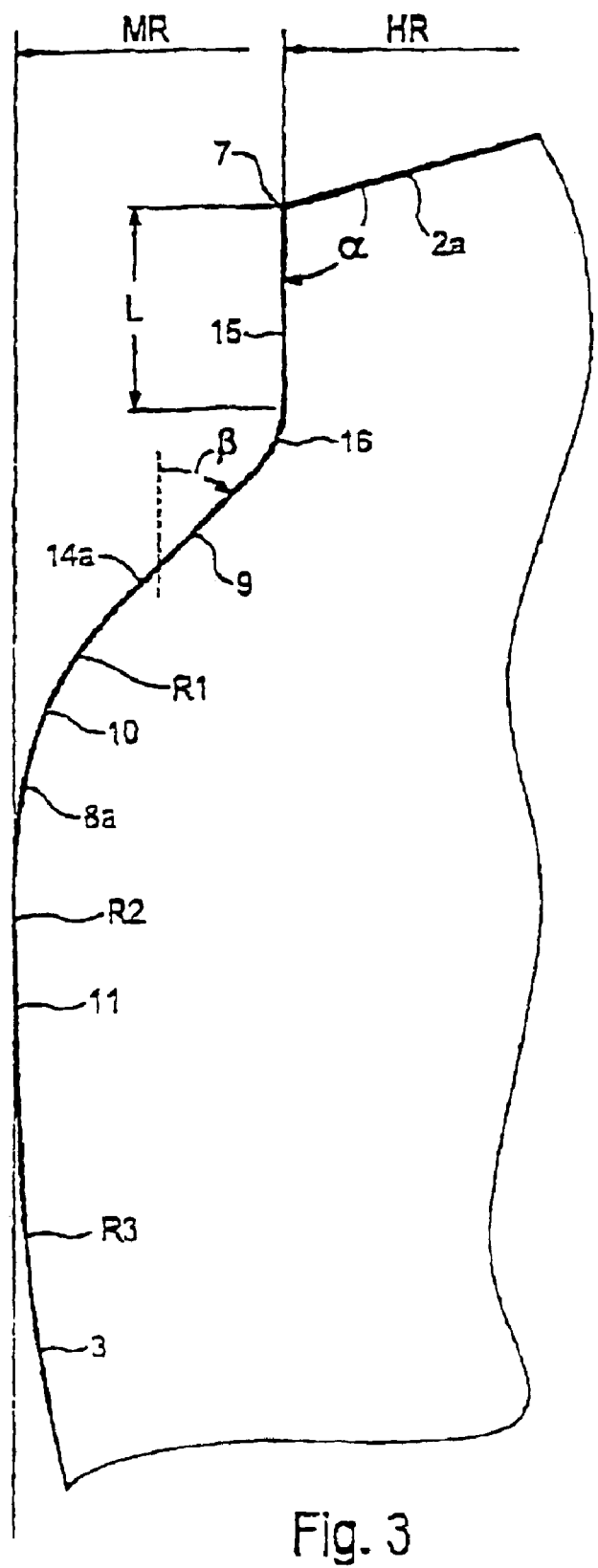
FIG. 3 is a portion of a main cutting edge and a secondary cutting edge of the rotary cutting tool according to FIG. 1

FIGS. 1 to 3 show a rotary tool configured as drill 1, generally referred to as rotary cutting tool, that has two main cutting edges 2a,2b that are arranged symmetrically with respect to the central axis M of a cutter portion 3. The main cutting edges 2a,2b are produced by grinding from the material of the cutter portion 3 and abut with one another at the tip 4 of the drill 1 with an obtuse angle. Two flute grooves 5 extend helically in the manner of a screw threading from the tip 4 to a clamping end or retaining portion 6 of drill 1. An embodiment with a greater number of main cutting edges can also be realized.

In the embodiment according to FIG. 1, the main cutting edges 2a,2b are arranged symmetrically with respect to the central axis M of the cutter portion 3 and of the drill 1. Particularly in the case of a greater number of main cutting edges, such can be arranged to be at least in part asymmetrically about the tool axis. Such an asymmetrical or partially symmetrical configuration is applicable, for example, in the case of a tool with three cutting edges. The material of the cutter portion 3 may be any wear resistant material, such as, HSS, hard metal, cermet, ceramic, CBN, PCD, respectively coated or uncoated.

The main cutting edge 2a is configured as a corner, as is illustrated in FIG. 3, and is adjacent to a cutting corner 7 via a transition angle a, and is adjacent to an axial portion 15 that extends parallel with respect to the central axis M. The position of the cutting corner 7 establishes a main cutting edge radius HR. By means of the main cutting edges 2a,2b, the material of the workpiece that is being worked is converted into chips, said material being the material present within the main cutting edge radius HR. Adjacent to the axial portion 15 is a curved portion 16 that, in turn, transitions into an introduction land or chamfer 9, also referred to as transition portion; next to this introduction land 9 is a curved portion 10 that is curved in the opposite direction with respect to the curved portion 16. The axial portion 15, the curved portion 16, the straight transition portion 9, and the curved portion 10, together configure a secondary cutting edge 8a. The introduction land 9 makes it easier to introduce the drill 1 into the workpiece to be worked on, and the risk of portions of the secondary cutting edge 8a that is configured as smooth finishing cutting edge of breaking away is minimized.

Outwardly beyond the main cutting edge radius HR, chip production is effectuated by the secondary cutting edge 8a, as well as a further secondary cutting edge 3b, not shown in FIG. 3, that is associated with the main cutting edge 2b. The curved portion 10 of the secondary cutting edge 8a is obtained by various radii of curvature R1,R2,R3, whereby the maximal cutting edge radius MR in the portion adjacent to radius of curvature R2 is disposed in an exterior smooth finishing region 11. The exterior smooth finishing region 11 determines the attainable surface quality of the hole that is being produced. The radius of curvature R2 is greater than the maximal cutting edge radius MR that corresponds to the radius of the hole being drilled. The main cutting edge 2a together with its adjacent secondary cutting edge 8a, configures a cutting edge 14a; the main cutting edge 2b correspondingly with the secondary cutting edge 8b configures a cutting edge 14b.

Because of presence of the axial portion 15, a subsequent sharpening-grinding, or sharpening regrinding, of the main cutting edges 2a,2b can be done without problems, and without essentially affecting the characteristics of the drill 1. The axial portion 15 has a length L, which is small when compared to the maximal cutting edge radius MR. In this manner it is achieved that the drill diameter deviates, also in the production of a blind hole, only to a minor extent of the hole from the maximal cutting edge radius MR. The ease with which sharpening-grinding, or sharpening regrinding, of the drill 1 is effectuated, allows, particularly in the case of drill diameters which do not permit utilization of cutting plates, for example, up to 16 millimeters, an extended utilization of a one-piece drill 1 even with attainable higher surface quality.

In contrast to the shown one-piece embodiment of the rotary cutting tool 1, this can also be a multi component, said multi component comprising a separate cutter portion 3 that can be mounted on a base body that comprises the retaining portion 6. Such a modular configuration of the rotary cutting tool 1, for example, a drill, such as, for example, a twist drill, a wiper twist drill, a drill having straight flutes, a countersink tool, a reaming tool, or combination type drilling tools, is particularly advantageous for tools with larger diameters. In the exemplary embodiment, the cutter portion 3 and the retaining portion 6 configure a unitary base body of the rotary cutting tool 1. In the base body can be retained, as inserts, in particular the secondary cutting edges 8a,8b or, respectively, the secondary cutting edges 13a,13b (FIGS. 4 to 6) that serve as friction cutting, or reaming edges. The base body is made of a tough material, preferably hard metal or cermet. The material of the secondary cutting edges 8a,8b or, respectively, the friction cutting, or reaming, edges 13a,13b, utilize a high wear resistant material, particularly polycrystalline diamond (PCD) or cubic boron nitrite or cubic boron nitride (CBN).

The advance feed of the drill 1 is preferably very minor in when compared to the radius of curvature R2. This means that in the exterior smooth finishing region 11 very thin chips are removed, the slightly curved chip cross-section of which is disposed in very good proximity parallel to the surface of the workpiece, such that a surface with a minimized roughness is produced with particularly at least nearly no grooves along the circumference of the hole. The axial portion 15 effectuates a chip separation, that is, the main cutting edge 2a, and the secondary cutting edge 8a, remove separate chips. The rough working or finishing within the main cutting edge radius HR is thus separated in defined manner from the smooth finishing working due to the secondary cutting edge 8a.

The secondary cutting edge 8a is inclined with respect to the central axis M by way of a secondary cutting angle β that in any portion of the secondary cutting edge is not greater than 45 degrees. In the region of the radius of curvature R3, that is, adjacent to the exterior smooth finishing region 11, in the direction towards the retaining portion 6 of the drill 1, the cutter portion 3 tapers slightly. Accordingly, in this region the secondary cutting angle β is negative. This provides the advantage, for one, that a diminished surface quality of the hole upon withdrawal of the drill 1 by portions of the cutter portion 3 is at least substantially prevented. Furthermore, the drill 1, due to the taper of the cutter portion 3, is less sensitive to thermally induced expansion of the drill 3 {1} in contrast to a drill that does not have such a taper.

Figure 5:
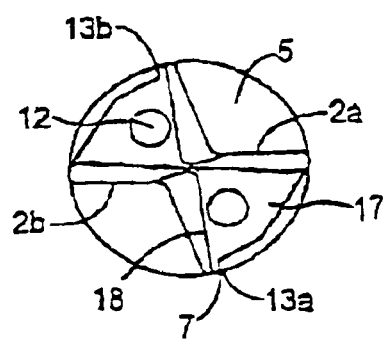
FIG. 5 is a top plan view of the rotary cutting tool according to FIG. 4.
Figure 4:
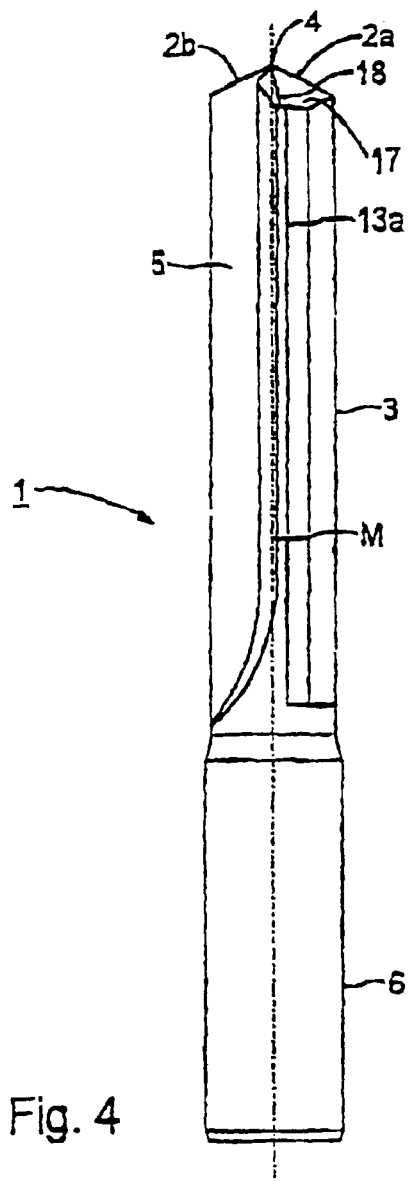
FIG. 4 shows a rotary cutting tool configured as a drill with straight flutes and friction cutting, or reaming, edges.
Figure 6:
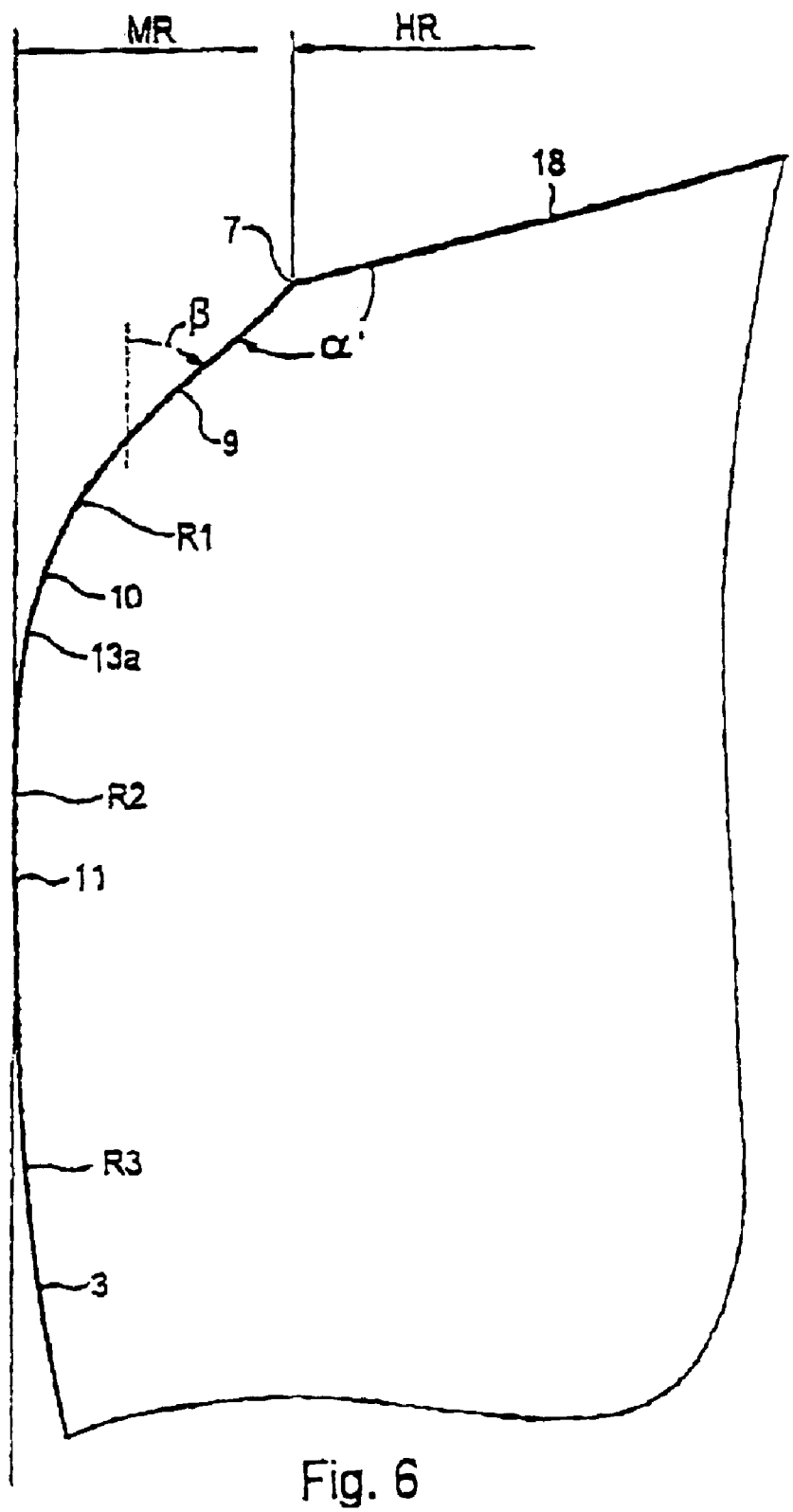
FIG. 6 shows a portion of a friction cutting, or reaming, edge of the rotary cutting tool according to FIG. 4.

FIGS. 4 to 6 illustrate in various views an alternative embodiment of a rotary cutting tool 1. The drill 1 in accordance with FIG. 4 has a straight flute groove 5 and is particularly suitable for drilling cast materials. Parallel to the central axis M, the cutter portion 3 has two coolant channels 12. Two secondary cutting edges 13a,13b are arranged at the cutter portion 3, in offset manner in relation to the main cutting edges 2a,2b at the circumference of the drill 1, and these secondary cutting edges are configured as friction cutting, or reaming, edges. The friction cutting, or reaming, edges 13a,13b that configure the smooth finishing cutting edges of the drill 1, determine the maximal cutting edge radius MR and the surface quality that can be achieved by the drill 1. Adjacent to the friction cutting, or reaming, edges 13a,13b associated with the main cutting edges 2a,2b there is directly no main cutting edge. Instead, the friction cutting, or reaming, edge 13a is disposed at the cutting corner 7 at a secondary free flank surface 17 that is adjacent to the main cutting edge 2a; and the friction cutting, or reaming, edge embraces with the corner that is delimiting the free flank surface, i.e., the free flank surface 18, a transition angle α'. As is particularly evident from FIG. 5, for this the free flank surface 18 may be positioned somewhat away from the cutting corner 7 of the friction cutting, or reaming, edge 13a. The transition angle α', in this case, is provided by the angle between the friction cutting, or reaming, edge 13a and the portion adjacent to the cutting corner 7 of the secondary free flank surface 17 that need not necessarily be planar. The cutting corner 7 when compared to the main cutting edge 2a, is disposed somewhat to the rear in the direction of the chucking portion 6 and, accordingly, is not in contact with the workpiece that is worked on. The distance of the cutting corner 7 from the central axis M in the case of a rotary cutting tool 1 in accordance with FIG. 4 does not necessarily correspond to the main cutting edge radius HR. Also, in the event of such a rotary cutting tool 1, there is adjacent to the main cutting edges 2a,2b, preferably, an axial portion 15, as is illustrated in FIG. 3. The configuration of the friction cutting, or reaming, edges 13a,13b corresponds, excepting the axial portion 15, at least approximately to the configuration of the smooth finishing cutting edges 8a,8b in the embodiment that is illustrated in FIGS. 1 to 3.

Figure 4A:
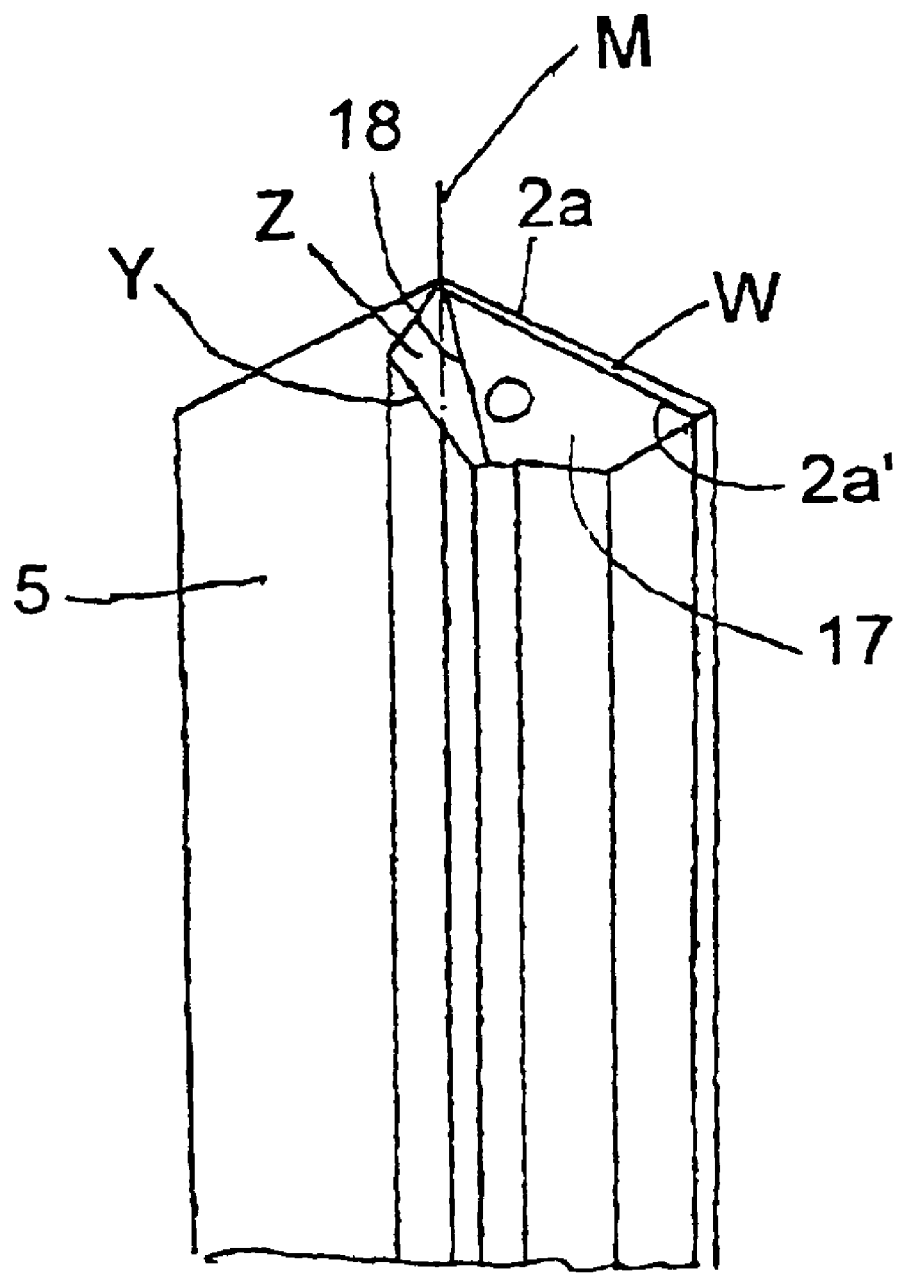
FIG. 4A shows a view similar to FIG. 4 with additional details illustrated therein.

Particularly referring to FIG. 4A, the tip of the drill has a sloped main flank surface, or gashing, W. The main flank surface W is bounded by main cutting edge 2a and the secondary free flank surface 17. The main flank surface W is a sloped surface from the cutting edge 2a to the connecting edge 2a' that is disposed between the main flank surface W and the secondary free flank surface 17 The main flank surface may possibly slope into the flute groove 5. It will be appreciated that the edge 2a' is not a cutting edge.

The tip further comprises a surface Z that extends between the open surface edge 18 and the line Y. Surface Z is a sloped surface that slopes from the open surface edge 18 down to line Y adjacent to the flute groove 5.

Figure 5A:
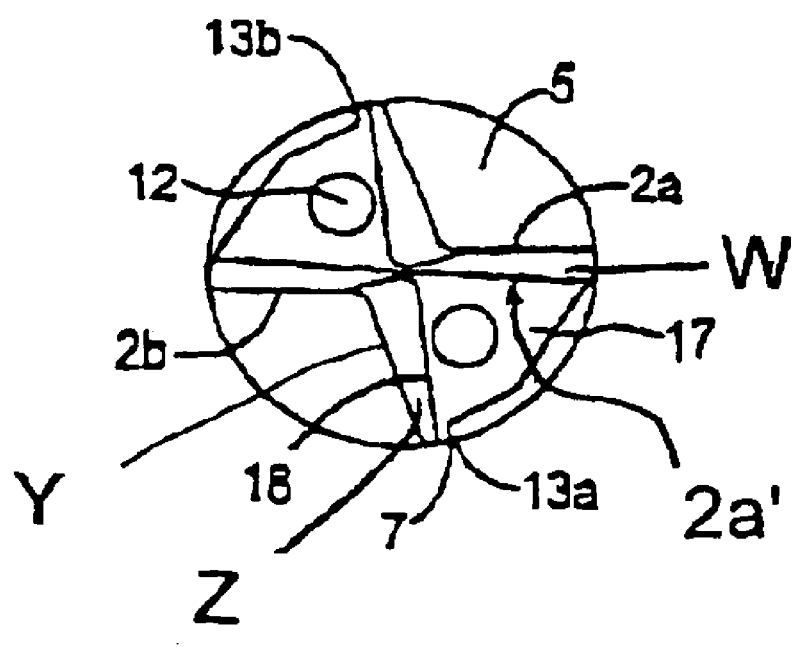
FIG. 5A is a view similar to FIG. 5 with additional details illustrated therein.

FIG. 5A is a top plan view of the tip of drill 1 as described herein above with reference to FIG. 4A.

Figure 7:
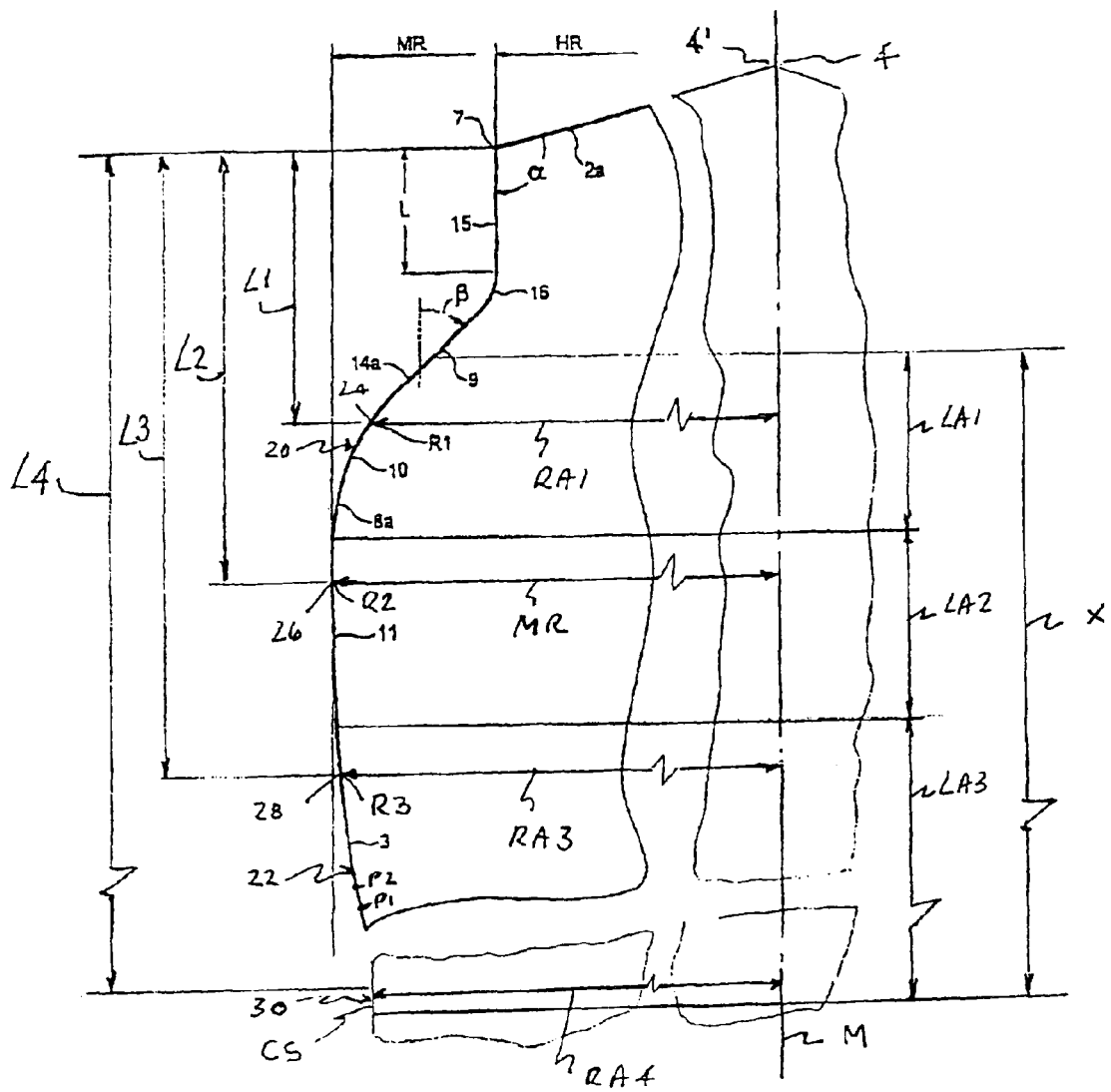
FIG. 7 is a diagram of the forward cutting edge of the rotary cutting tool in accordance with FIG. 1.

With reference to FIG. 7 a fluted portion comprises a cutting edge such as 8a that is configured to drill a hole 99 having a final diameter, with the final diameter hole 99 being greater than the first diameter hole drilled by the tip portion 4 of twist drill 1.

The cutting edge 8a comprises a first cutting edge portion 20, and a second edge portion 22.

The first cutting edge portion 20 comprises a first edge area 24, a second edge area 26, and a third edge area 28. The second edge portion 22 comprising a fourth edge area 30. This fourth edge area 30 is disposed within a cylindrical surface CS.

The first edge area 24 is disposed at a first distance L1 measured along the central longitudinal axis, or axis of rotation or axis of revolution, M from the tip portion 4. The second edge area 26 is disposed at a second distance L2 measured along the central longitudinal axis M from the tip portion 4. The third edge area 28 is disposed at a third distance L3 measured along the central longitudinal axis M from the tip portion 4. The fourth edge area 30 is disposed at a fourth distance L4 measured along the central longitudinal axis M from the tip portion 4.

In at least one possible embodiment of the invention, the second longitudinal distance L2 is greater than the first longitudinal distance L1, and the third longitudinal distance L3 is greater than the second longitudinal distance L2. Also, the fourth longitudinal distance L4 is greater than the third longitudinal distance L3.

The mentioned first edge area 24 furthermore is disposed at a first distance RA1 from the central longitudinal axis M, the first distance RA1 being measured radially from the central longitudinal axis M. The second edge area 26 is disposed at a second distance MR from the central longitudinal axis M, with the second distance MR being measured radially from the central longitudinal axis M. The third edge area 28 is disposed at a third distance RA3 from the central longitudinal axis M, with the third distance RA3 being measured radially from the central longitudinal axis M. The fourth edge area 30 is disposed at a fourth distance RA4 from the central longitudinal axis M, with the fourth distance RA4 being measured radially from the central longitudinal axis M.

The mentioned second chisel edge end 7 of the tip portion 4 is disposed at a distance HR from the central longitudinal axis M, with the distance HR of the second chisel edge end 7 being measured radially from the central longitudinal axis M.

In at least one possible embodiment of the invention, the second radial distance MR, of the second edge area 26, is greater than all of (i.), (ii.), and (iii.), wherein (i.), (ii.),and (iii.) comprise: (i.) the first radial distance RA1, of the first edge area 24; (ii.) the third radial distance RA3, of the third edge area 28; and (iii.) the radial distance HR, of the second chisel edge end 7 of the tip portion 4.

In at least one possible embodiment of the present invention at least one of the first edge area 24, the second edge area 26, and the third edge area 28 comprising a curved portion, with a radius of curvature of one of R1,R2, or R3.

It will be appreciated that the respective curved portion comprises at least a first point, such as P1, and a second point, such as P2, with the second point P2 being disposed further away from the central longitudinal axis M than the first point P1.

Furthermore, the first edge area 24 has a first length LA1; the second edge area 26 has a second length LA2; and the third edge area 28 has a third length LA3.

In at least one possible embodiment of the invention, the sum, shown as X in FIG. 7, of the lengths LA1, LA2, and LA3, of the first edge area 24, the second edge area 26, and the third edge area 28 is substantially greater than the difference between the second radial distance MR, of the second edge area 26, and the radial distance HR, of the second chisel edge end 7, of the tip portion 4'.

In one possible embodiment of the invention, the ratio of (MR-HR)/X lies in the range of from about 0.12 to 0.25.

With reference to FIG. 7A a fluted portion comprises a cutting edge such as 13a that is configured to drill a hole 99 having a final diameter, with the final diameter hole 99 being greater than the first diameter hole drilled by the tip portion 4 of twist drill 1.

The cutting edge 13a comprises a first cutting edge portion 20', and a second edge portion 22'.

The first cutting edge portion 20' comprises a first edge area 24', a second edge area 26', and a third edge area 28'. The second edge portion 22' comprising a fourth edge area 30'. This fourth edge area 30' is disposed within a cylindrical surface CS.

The first edge area 24' is disposed at a first distance L1' measured along the central longitudinal axis M from the tip portion 4'. The second edge area 26' is disposed at a second distance L2' measured along the central longitudinal axis M from the tip portion 4'. The third edge area 28' is disposed at a third distance L3' measured along the central longitudinal axis M from the tip portion 4'. The fourth edge area 30' is disposed at a fourth distance L4' measured along the central longitudinal axis M from the tip portion 4'.

In at least one possible embodiment of the invention, the second longitudinal distance L2' is greater than the first longitudinal distance L1', and the third longitudinal distance L3' is greater than the second longitudinal distance L2'. Also, the fourth longitudinal distance L4' is greater than the third longitudinal distance L3'.

The mentioned first edge area 24' furthermore is disposed at a first distance RA1' from the central longitudinal axis M, the first distance RA1' being measured radially from the central longitudinal axis M. The second edge area 26' is disposed at a second distance MR from the central longitudinal axis M, with the second distance MR being measured radially from the central longitudinal axis M. The third edge area 28' is disposed at a third distance RA3' from the central longitudinal axis M, with the third distance RA3' being measured radially from the central longitudinal axis M. The fourth edge area 30' is disposed at a fourth distance RA4' from the central longitudinal axis M, with the fourth distance RA4' being measured radially from the central longitudinal axis M.

The mentioned second chisel edge end 7 of the tip portion 4' is disposed at a distance HR from the central longitudinal axis M, with the distance HR of the second chisel edge end 7 being measured radially from the central longitudinal axis M.

In at least one possible embodiment of the invention, the second radial distance MR, of the second edge area 26', is greater than all of (i.), (ii.), and (iii.), wherein (i.), (ii.),and (iii.) comprise: (i.) the first radial distance RA1', of the first edge area 24'; (ii.) the third radial distance RA3', of the third edge area 28'; and (iii.) the radial distance HR, of the second chisel edge end 7 of the tip portion 4'.

In at least one possible embodiment of the present invention at least one of the first edge area 24', the second edge area 26', and the third edge area 28' comprising a curved portion, with a radius of curvature of one of R1,R2, or R3.

It will be appreciated that the respective curved portion comprises at least a first point, such as P1, and a second point, such as P2, with the second point P2 being disposed further away from the central longitudinal axis M than the first point P1.

Furthermore, the first edge area 24' has a first length LA1'; the second edge area 26' has a second length LA2'; and the third edge area 28' has a third length LA3'.

In at least one possible embodiment of the invention, the sum, shown as X in FIG. 7A, of the lengths LA1', LA2', and LA3', of the first edge area 24', the second edge area 26', and the third edge area 28' is substantially greater than the difference between the second radial distance MR, of the second edge area 26', and the radial distance HR, of the second chisel edge end 7, of the tip portion 4'.

In one possible embodiment of the invention, the ratio of (MR-HR)/X lies in the range of from about 0.12 to 0.25, or even more or less as can be determined by experimentation.

Figure 8:
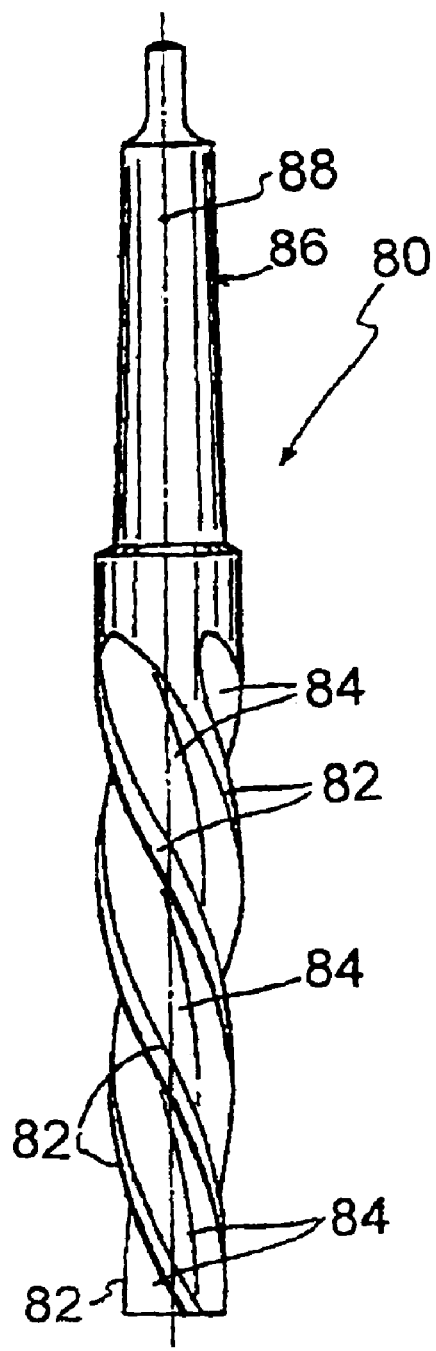
FIG. 8 is an elevational view of a reamer rotary cutting tool.

FIG. 8 is an illustration of a reamer or reaming tool 80, comprising a conical reamer having cutting portions 82 and chip-receiving grooves or flutes 84 that are disposed in alternate sequence around the periphery of the tapering tool 80. FIG. 8 shows a tool 80 in which the cutting portions 82 and the grooves 84 are of a helical configuration but it will be appreciated that the tool 80 may also have cutting portions 82 and grooves 84 which extend in straight or rectilinear an parallel relationship to each other and to the longitudinal direction of the tool 80. Reference numeral 86 in FIG. 8 denotes a shank portion of the tool 80, for retaining the tool 80 in a tool holder. Reference numeral 88 designates the central longitudinal axis of tool 80.

Tool 80 utilizes the cutting edge as described herein above in reference to a drill such as twist drill 1.

Figure 9:
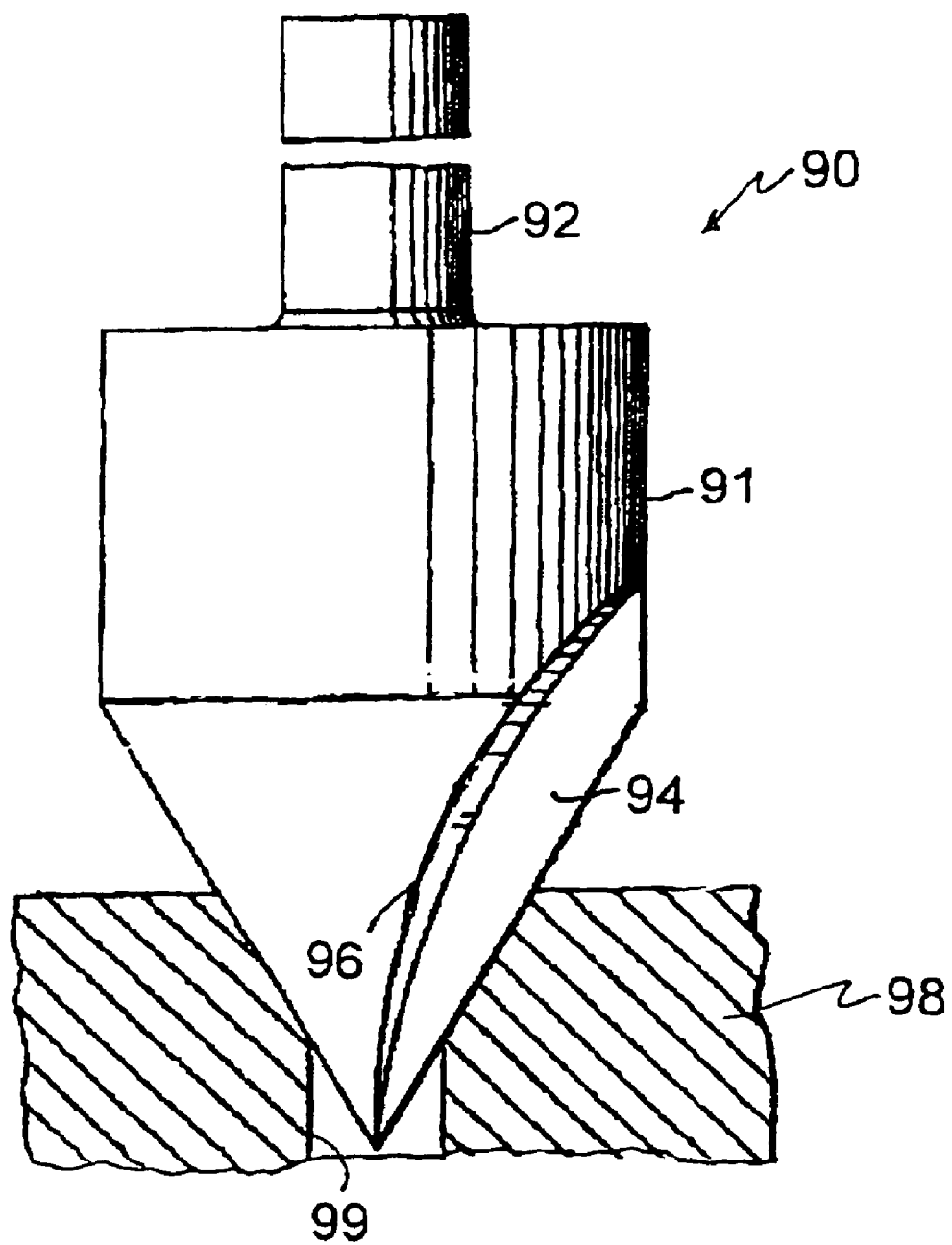
FIG. 9 is an elevational view of a countersink rotary cutting tool.

FIG. 9 shows an elevation of a countersink or countersink tool 90 countersinking a hole 99 in an object 98. This tool 90 has a body head shown at 91, with a shank 92. The tool 90 has a desired number of flutes, of which one is designated by reference numeral 94, and a corresponding cutting edge 96 which may be configured as described herein above with reference to twist drill 1.

It will be appreciated that in one possible embodiment of the invention, a twist drill 1 is configured to drill a hole 99 in a metal object 98, the twist drill 1 comprising a shaft portion 6 configured to retain the twist drill 1 for drilling. Drill 1 has a cutting portion 3 that is disposed adjacent the shaft portion 6. The cutting portion 3 comprises a tip portion 4 and a fluted portion 5. The tip portion 4 is configured to drill a hole 99 having a first diameter in a metal object 98 by way of at least one chisel edge 2a. Each of the at least one chisel edge 2a,2b comprising a first end 4' and a second end 7. The shaft portion 6 and the cutting portion 3 defining a central longitudinal axis M that is disposed through the shaft portion 6 and the cutting portion 3.

Coolant channels 12 are configured to pass a coolant to lubricate and cool the tip portion 4.

It will be appreciated that the first chisel edge end 4' is disposed closer to the central longitudinal axis M than the second chisel edge end 7 and that the fluted portion 5 is disposed between the tip portion 4 and the shaft portion 6.

The fluted portion 5 comprises a cutting edge such as 8a,8b or 13a,13b, that is configured to drill a hole 99 having a final diameter, with the final diameter hole 99 being greater than the first diameter hole drilled by the tip portion 4 of twist drill 1.

The fluted cutting edge comprises a first cutting edge portion 20 (see FIG. 7), and a second edge portion 22.

The first cutting edge portion 20 comprises a first cutting edge area 24, a second cutting edge area 26, and a third cutting edge area 28. The second edge portion 22 comprising a fourth edge area 30. This fourth edge area 30 is disposed within a cylindrical surface CS.

The first cutting edge area 24 is disposed at a first distance L1 measured along the central longitudinal axis M from the tip portion 4. The second cutting edge area 26 is disposed at a second distance L2 measured along the central longitudinal axis M from the tip portion 4. The third cutting edge area 28 is disposed at a third distance L3 measured along the central longitudinal axis M from the tip portion 4. The fourth edge area 30 is disposed at a fourth distance L4 measured along the central longitudinal axis M from the tip portion 4.

In at least one possible embodiment of the invention, the second longitudinal distance L2 is greater than the first longitudinal distance L1, and the third longitudinal distance L3 is greater than the second longitudinal distance L2. Also, the fourth longitudinal distance L4 is greater than the third longitudinal distance L3.

The mentioned first cutting edge area 24 furthermore is disposed at a first distance RA1 from the central longitudinal axis M, the first distance RA1 being measured radially from the central longitudinal axis M. The second cutting edge area 26 is disposed at a second distance MR from the central longitudinal axis, with the second distance MR being measured radially from the central longitudinal axis M. The third cutting edge area 28 is disposed at a third distance RA2 from the central longitudinal axis M, with the third distance RA3 being measured radially from the central longitudinal axis M.

The mentioned second chisel edge end 7 of said tip portion 4 is disposed at a distance HR from the central longitudinal axis M, with the distance HR of the second chisel edge end 7 being measured radially from the central longitudinal axis M.

In at least one possible embodiment of the invention, the second radial distance MR, of the second cutting edge area 26, is greater than all of (i.), (ii.), and (iii.), wherein (i.), (ii.), and (iii.) comprise: (i.) the first radial distance RA1, of the first cutting edge area 24; (ii.) the third radial distance RA3, of the third cutting edge area 28; and (iii.) the radial distance HR, of the second chisel edge end 7 of the tip portion 4.

In at least one possible embodiment of the present invention at least one of the first cutting edge area 24, the second cutting edge area 26, and the third cutting edge area 28 comprising a curved portion, with a radius of curvature of one of R1,R2, or R3.

It will be appreciated that the respective curved portion comprises at least a first point, such as P1, and a second point, such as P2 (FIG. 7), with the second point P2 being disposed further away from the central longitudinal axis M than the first point P1.

Furthermore, the first cutting edge area 24 has a first length LA1; the second cutting edge area 26 has a second length LA2; and the third cutting edge area 28 has a third length LA3.

In at least one possible embodiment of the invention, the sum, shown as X in FIG. 7, of the lengths LA1, LA2, and LA3, of the first cutting edge area 24, the second cutting edge area 26, and the third cutting edge area 28 is substantially greater than the difference between the second radial distance MR, of the second cutting edge area 26, and the radial distance HR, of the second chisel edge end 7, of the tip portion 4.

In one possible embodiment of the invention, the ratio of (MR-HR)/X lies in the range of from about 0.12 to 0.25, or even more or less as can be determined by experimentation.

It will be appreciated that this twist drill 1 is configured to drill a hole 99 with a smoother surface finish than a hole drilled by an equivalent twist drill wherein the corresponding first cutting edge area, the corresponding second cutting edge area, and the corresponding third cutting edge area, of the equivalent drill, lie on the same cylindrical surface.

One feature of the invention resides broadly in the rotary cutting tool, particularly drill, that has at least two cutting edges (14a, 14b) that respectively comprise a main cutting edge (2a,2b) and that respectively are disposed, particularly symmetrically, with respect to the central axis (M) of a cutter portion (3), whereby the radius (HR) of the main cutting edges is less than the maximal cutting edge radius (MR) of the cutter portion (3), at least one secondary cutting edge (8a,8b,13a,13b) is associated with a main cutting edge (2a,2b), said secondary cutting edge is curvilinear in at least a portion and is configured as smooth finishing cutting edge, said secondary cutting edge comprises a plurality of curve-forming radii (R1,R2,R3), whereby in an outer smooth finishing region (11) within the region of the maximal cutting radius (MR), the curve-forming radius (R2) of the smooth finishing cutting edge (8a,8b,13a,13b) is at least as large as the maximal cutting edge radius (MR), the cutter portion (3) that is adjacent to the outer smooth finishing region (11) is tapered to be diminished in size in the direction away from the main cutting edges (2a,2b).

Another feature of the invention resides broadly in the rotary cutting tool characterized thereby that each smooth finishing cutting edge (13a,13b) associated with one main cutting edge (2a,2b) is adjacent to a cutting corner (7), by way of a transition angle (α') of at least 140 degrees and maximally 179 degrees, at an edge (18).

Yet another feature of the invention resides broadly in the rotary cutting tool characterized by an axial region (15) of a cutting edge (14a,14b), said axial region being disposed adjacent to the associated main cutting edge (2a,2b) and essentially parallel to the central axis (M)

Still another feature of the invention resides broadly in the rotary cutting tool characterized thereby that the angle of transition (α) between the main cutting edge (2a,2b) and the adjacent axial region (15) is at least 110 degrees and maximally 121 degrees.

A further feature of the invention resides broadly in the rotary cutting tool characterized thereby that the length (L) of the axial region (15) is less than the maximal cutting edge radius (MR).

Another feature of the invention resides broadly in the rotary cutting tool characterized thereby that the secondary cutting edge (8a,8b,13a,13b) embraces, together with the central axis (M), a maximal secondary cutting angle (β) of at least 30 degrees and maximally 60 degrees.

Yet another feature of the invention resides broadly in the rotary cutting tool characterized thereby that the radius (HR) of the main cutting edge is at least 90% and maximally 98% of the maximal cutting edge radius (MR).

Still another feature of the invention resides broadly in the rotary cutting tool characterized thereby that a secondary cutting edge (8a,8b,13a,13b) is configured as friction cutting, or reaming, edge (13a,13b) without contiguous main cutting edge, and that this friction cutting, or reaming, edge (13a,13b) determines, as smooth finishing cutting edge, the maximal cutting edge radius (MR).

A further feature of the invention resides broadly in the rotary cutting tool characterized thereby that one secondary cutting edge (8a,8b,13a,13b) in the region of the maximal cutting edge radius (MR) is straight.

Another feature of the invention resides broadly in the rotary cutting tool characterized thereby that one of the secondary cutting edges (8a,8b,13a,13b) is made of polycrystalline diamond (PCD).

Yet another feature of the invention resides broadly in the rotary cutting tool characterized thereby that one secondary cutting edge (8a,8b,13a,13b) is made of cubic boron nitrite or cubic boron nitride (CBN).

Still another feature of the invention resides broadly in the rotary cutting tool characterized thereby that one secondary cutting edge (8a,8b,13a,13b) is made of ceramic.

A further feature of the invention resides broadly in the rotary cutting tool characterized thereby that one cutting edge (2a,2b,8a,8b,13a,13b) is held on a base body (3,6).

Another feature of the invention resides broadly in the rotary cutting tool characterized thereby that one cutting edge (2a,2b,8a,8b,13a,13b) is held on a base body (3,6) of cermet.

The following patents or patent publications and other publications, also relating to drills and methods of making drills, which were cited in corresponding Federal Republic of Germany patent application DE 102 04 105.9-14, filed on Feb. 1, 2002 are hereby incorporated by reference as if set forth in their entirety herein as follows: Federal Republic of Germany patent No. DE 42 36 824, corresponding to U.S. Pat. No. 5,312,208 issued on May 17, 1994; and International patent application publication No. WO 00/21704 published on Apr. 20, 2000.

One feature of the invention resides broadly in a twist drill, wherein at least one of (i.) and (ii.), wherein (i.) and (ii.) comprise: (i.) said second cutting edge area is straight; and (ii.) said first cutting edge area, said second cutting edge area, and said third cutting edge area are disposed on a continuous curve.

Another feature of the invention resides broadly in a twist drill, wherein: said first cutting edge area is curved; said first curved cutting edge having a first radius of curvature; said second cutting edge area is curved; said second curved cutting edge having a second radius of curvature; said second radius of curvature has a length at least equal to the length of said second radial distance (MR) of said second cutting edge; and said third cutting edge area is curved; said third curved cutting edge having a third radius of curvature.

Still another feature of the invention resides broadly in a twist drill, wherein (a.) each said at least one chisel edge and its associated cutting edge intersect at a first angle (α'); said first angle (α') is within the range of from about 140 degrees to about 179 degrees; (b.) said tip portion comprises a cylindrical portion; said cylindrical portion is disposed between said tip portion and said cutting edge; said cylindrical portion having a central longitudinal axis disposed coincidental with said central longitudinal axis of said twist drill; (c.) said tip portion comprises a cylindrical portion; each said at least one chisel edge and said cylindrical portion intersect at a second angle (α); said second angle (α) is within the range of from about 110 degrees to about 121 degrees; (d.) said tip portion comprises a cylindrical portion; said cylindrical portion has a length that is less than said second radial distance (MR) of said second cutting edge portion; (e.) said cutting edge portion is disposed at an angle (β) of from about 30 degrees to about 60 degrees with respect to said central longitudinal axis of said twist drill; (f.) said radial distance (HR), of said second chisel edge end of said tip portion, comprises a distance within the range of from about 90% to about 98% of said second radial distance (MR), of said second cutting edge portion; (g.) said tip portion comprises a flat tip portion; (h.) at least said first cutting edge portion comprises at least one of (i.), (ii.), and (iii.), wherein (i.), (ii.), and (iii.) comprise: (i.) polycrystalline diamond; (ii.) cubic boron nitride; and (iii.) ceramic; (j.) at least a portion of said first cutting edge portion comprises an insert; said insert is configured to be secured to one of (i.), and (ii.), wherein (i.) and (ii.) comprise: (i.) said cutting portion; and (ii.) said shaft portion; (k.) at least one of (i.) and (ii.), wherein (i.) and (ii.) comprise: (i.) a cutting portion comprising cermet; and (ii.) a shaft portion comprising cermet.

It is to be understood that any of the distances, percentages, or degrees of angles listed above are examples of the dimensions that may be utilized in at least one embodiment according to the present invention. It is to be further understood that one skilled in the art to which the present invention most nearly pertains would be able to modify any or all of the above dimensions in at least one embodiment of the present invention.

For example, in at least one embodiment of the present invention, the angle of transition α' between a smooth finishing cutting edge and a main cutting edge is in the range of from at least 140 degrees and about 179 degrees. Such range can possibly include increments of at least about 1 degree, that is the range includes at least 140 degrees, 141 degrees, 142 degrees and so forth to 176 degrees, 177 degrees, 178 degrees, and 179 degrees. It will be appreciated that smaller increments are included within the range and that the limits of the range may vary.

For example, in at least one embodiment of the present invention, the angle of transition a is preferably in a range between 110 degrees and 121 degrees. Such range can possibly include increments of at least about 1 degree, that is the range includes at least 110 degrees, 111 degrees, 112 degrees, 113 degrees, 114 degrees, 115 degrees, 116 degrees, 117 degrees, 118 degrees, 119 degrees, 120 degrees, and 121 degrees. It will be appreciated that smaller increments are included within the range and that the limits of the range may vary.

For example, in at least one embodiment of the present invention, the angle β can possibly be in the range including 30 degrees, 31 degrees, 32 degrees, 33 degrees, 34 degrees, 35 degrees, and so forth to 57 degrees, 58 degrees, 59 degrees, and 60 degrees. It will be appreciated that smaller increments are included within the range and that the limits of the range may vary.

For example, in at least one embodiment of the present invention, the radius (HR) of the main cutting edge is at least 90% to 98% of the maximal cutting edge radius (MR), and the range includes 90%, 91%, 92%, 93%, 94%, 95%, 96%, 97%, and 98%. It will be appreciated that smaller increments are included within the range and that the limits of the range may vary.

Further, depending on the various factors involved, in at least one other embodiment of the present invention, the dimensions of the drill, in particular the chisel edges, could be modified. Such factors as the desired size and depth of the hole to be drilled, the type of material to be drilled, the desired length, width, and circumference of the drill, the type of material the drill is made of, and the desired rotation or gyration of the drill all would affect the necessary dimensions and asymmetrical measurements of the drill. A person skilled in the art to which the present invention most nearly pertains would be able to selectively modify the dimensions to accommodate the requirements of the factors listed herein above.

It will be appreciated that in the case of a twist drill, the cutting edge is disposed helically with respect to the central longitudinal axis. For simplicity of drawing, the cutting edge disposed on the helical surface is shown as a straight line in the drawing. Further, the straight line as stated in the specification, includes cutting edge that is disposed helically with respect to the central longitudinal axis. The "straight line" that is helical is disposed on an imaginary cylinder having the central longitudinal axis as axis of rotation. It will be appreciated that in the case of other comparable tools, where the cutting edge or equivalent is not disposed on a true straight line, such cutting edge or equivalent may be disposed on a helix and an imaginary cylinder. However, the indication of a straight line in the drawing and in the specification includes the case where the cutting edge or equivalent is disposed on a helix and/or is disposed on an imaginary cylinder.

In at least one possible embodiment of the invention, the rotary cutting tool may comprise a single flute, or several flutes, as determined by the use of the rotary cutting tool.

Thus there is also provided a rotary cutting tool (1), particularly a drill, that has at least two cutting edges (14a, 14b) that respectively comprise a main cutting edge (2a,2b) and that respectively are disposed, particularly symmetrically, with respect to the central axis (M) of a cutter portion (3), whereby the radius (HR) of the main cutting edges is less than the maximal cutting edge radius (MR) of the cutter portion (3). A secondary cutting edge (8a, 8b,13a, 13b) is associated with a main cutting edge (2a,2b), said secondary cutting edge is curvilinear in at least a portion and is configured as smooth finishing cutting edge, said secondary cutting edge comprises a plurality of curve-forming radii (R1,R2,R3), whereby in an outer smooth finishing region (11) within the region of the maximal cutting edge radius (MR), the curve-forming radius (R2) of the smooth finishing cutting edge (8a,8b,13a,13b) is greater than the maximal cutting edge radius (MR). The cutter portion (3) that is adjacent to the outer smooth finishing region (11) is tapered by a taper that diminishes the size in the direction away from the main cutting edges (2a,2b).

The following U.S. Patents regarding drills are hereby incorporated by reference as if set forth in their entirety herein: U.S. Pat. No. 5,800,100, issued to Krenzer on Sep. 1, 1998; NHL-KEH-06, issued to Kammermeier on Nov. 3, 1998; U.S. Pat. No. 5,967,710, issued to Krenzer on Oct. 9, 1999; U.S. Pat. No. 6,045,301, issued to Kammermeier et al.

on Apr. 4, 2000; U.S. Pat. No. 6,116,825, issued to Kammermeier et al. on Sep. 12, 2000; U.S. Pat. No. 6,164,879, issued to Krenzer on Dec. 26, 2000; U.S. Pat. No. 6,210,083, issued to Kammermeier et al. on Apr. 3, 2001; U.S. Pat. No. 6,231,276, issued to Müller et al. on May 15, 2001; U.S. Pat. No. 5,904,455, issued to inventors Krenzer et al. on May 18, 1999; and U.S. Pat. No. 6,309,149, issued to inventor Borschert Oct. 30, 2001. The following U.S. Patent Applications regarding drills are hereby incorporated by reference as if set forth in their entirety herein: Ser. No. 09/521,134, having inventors Gebhard MÜLLER and Horst JAGER, filed on Mar. 8, 2000; Ser. No. 09/927,921, having inventors Bernhard Walter BORSCHERT, Jochen STIES, Dieter Hermann MÜHLFRIEDEL, and Karl-Heinz WENDT, filed on Aug. 10, 2001; Ser. No. 09/935,078, having inventors Hans-Wilm HEINRICH, Manfred WOLF, and Dieter SCHMIDT, filed on Aug. 22, 2001; Ser. No. 09/966,735, having inventor Ulrich KRENZER, filed on Sep. 28, 2001; and Ser. No. 10/008,528, having inventor Rudi HARTLOHNER, filed on Nov. 5, 2001; Ser. No. 10/0614,448, having inventor Urich KRENZER filed on Feb. 1, 2002; Ser. No. 10/147,444, having inventors Bernhard BORSCHERT and Dieter M ÜHLFRIEDEL filed on May 16, 2002; and Ser. No. 10/307,224 having inventors Dieter MÜHLFRIEDEL, Bernhard BORSCHERT, and Jürgen SCHWÄGERL, filed on Nov. 29, 2002.

Some examples of rotary cutting tools, features of which may possibly be used or adapted for use in at least one possible embodiment of the present invention may be found in the following U.S. patents: U.S. Pat. No. 4,558,975 issued on Dec. 17, 1985 to Hale and entitled "Drill with disposable inserts;" U.S. Pat. No. 5,354,156 issued on Oct. 11, 1994 to von Haas et al. and entitled "Drilling tool;" U.S. Pat. No. 5,509,761 issued on Apr. 23, 1996 to Grossmann et al. and entitled "Drill;" U.S. Pat. No. 5,688,083 issued on Nov. 18, 1997 to Boianjiu and entitled "Drilling tool and an indexing cutting insert for use therein;" U.S. Pat. No. 5,800,100 issued on Sep. 1, 1998 to Krenzer and entitled "Drilling tool with reset inserts;" U.S. Pat. No. 5,829,927 issued on Nov. 3, 1998 to Nakamura et al. and entitled "Drill and throw-away tip;" U.S. Pat. No. 5,890,853 issued on Apr. 6, 1999 to Hiranaka and entitled "Drill and drill tip;" U.S. Pat. No. 5,967,710 issued on Oct. 19, 1999 to Krenzer and entitled "Drilling tool for drilling in solid metal;" U.S. Pat. No. 5,967,712 issued on Oct. 19, 1999 to Magil et al. and entitled "Cutting tool for machining bores in materials having spring-back;" U.S. Pat. No. 6,145,606 issued on Nov. 14, 2000 to Haga and entitled "Cutting insert for roof drill bit;" U.S. Pat. No. 6,164,879 issued to Krenzer on Dec. 26, 2000 and entitled "Drilling tool for drilling in solid metal;" U.S. Pat. No. 6,238,151 issued on May 29, 2001 to Takagi and entitled "Drilling tool and throw-away tip for use in drilling work;" and U.S. Pat. No. 6,315,064 issued on Nov. 13, 2001 to Massa et al. and entitled "Rotatable cutting bit assembly with cutting insert." All the patents cited herein are hereby incorporated by reference as if set forth in their entirety herein.

All of the references, and documents, cited in any of the documents cited herein, and the references they are in turn cited in are hereby incorporated by reference as if set forth in their entirety herein. All of the documents cited herein, referred to in the immediately preceding sentence, include all of the patents, patent applications and publications cited anywhere in the present application. All of the references included herein as aforesaid include the corresponding equivalents published by the United States Patent and Trademark Office and elsewhere.

Some examples of twist drills features of which may possibly be used or adapted for use in at least one possible embodiment of the invention may be found in the following U.S. patents: U.S. Pat. No. 4,983,079 issued on Jan. 8, 1991 to Imanaga et al. and entitled "Twist drill;" U.S. Pat. No. 5,380,133 issued on Jan. 10, 1995 to Schimmer and entitled "Drill bit of the twist drill type;" U.S. Pat. No. 5,590,987 issued on Jan. 7, 1997 to Bouzounie and entitled "Precision twist drill bit;" U.S. Pat. No. 6,045,305 issued on Apr. 4, 2000 to Plummer and entitled "Helically fluted twist drill;" U.S. Pat. No. 6,315,504 issued on Nov. 13, 2001 to Sekiguchi et al. and entitled "Twist drill;" and U.S. Pat. No. 6,443,674 issued on Sep. 3, 2002 to Jaconi and entitled "Self-centering twist drill having a modified flat bottom section and a helical crown point tip." All the patents cited herein are hereby incorporated by reference as if set forth in their entirety herein.

Some examples of drills with straight flutes, features of which may possibly be used or adapted for use in at least one possible embodiment of the invention may be found in the following U.S. patents: U.S. Pat. No. 4,072,438 issued on Feb. 7, 1978 to Powers and entitled "Insert type drill and insert therefor;" U.S. Pat. No. 4,131,383 issued on Dec. 26, 1978 to Powers and entitled "Insert type drill and insert therefor;" U.S. Pat. No. 4,278,373 issued on Jul. 14, 1981 to Wolfe, III and entitled "Indexable insert drill;" U.S. Pat. No. 5,217,332 issued on Jun. 8, 1993 to Takasaki et al. and entitled "Drill bit for advanced materials;" U.S. Pat. No. 5,967,707 issued on Oct. 19, 1999 to Larson and entitled "Short-hole drill bit;" and U.S. Pat. No. 6,443,674 issued on Sep. 3, 2002 to Jaconi and entitled "Self-centering twist drill having a modified flat bottom section and a helical crown point tip." All the patents cited herein are hereby incorporated by reference as if set forth in their entirety herein.

The components disclosed in the various publications, disclosed or incorporated by reference herein, may be used in the embodiments of the present invention, as well as equivalents thereof.

Some examples of reamers or reaming tools, features of which may possibly be used or adapted for use in at least one possible embodiment of the invention may be found in the following U.S. patents: U.S. Pat. No. 4,932,815 issued on Jun. 12, 1990 to Krauss and entitled "Boring or reaming tool;" U.S. Pat. No. 5,354,155 issued on Oct. 11, 1994 to Adams and entitled "Drill and reamer for composite material;" U.S. Pat. No. 5,906,458 issued on May 25, 1999 to Planche and entitled "Reamer with clamping arrangement for adjustable cutting insert;" and U.S. Pat. No. 5,921,728 issued on Jul. 13, 1999 to Kammeraad et al. and entitled "Reamer with radial relief and cutting land." All the patents cited herein are hereby incorporated by reference as if set forth in their entirety herein.

The appended drawings in their entirety, including all dimensions, proportions and/or shapes in at least one embodiment of the invention, are accurate and are hereby included by reference into this specification.

Some examples of countersinks or countersink tools, features of which may possibly be used or adapted for use in at least one possible embodiment of the invention may be found in the following U.S. patents: U.S. Pat. No. 2,437,364 issued to Smith on Mar. 9, 1948 and entitled "Drill and countersink tool;" U.S. Pat. No. 2,442,554 issued on Jun. 1, 1948 to Swiatek and entitled "Countersink and center reamer;" U.S. Pat. No. 4,197,042 issued on Apr. 8, 1980 to Krhounek et al. and entitled "Countersinking tool;" U.S. Pat. No. 4,917,550 issued on Apr. 17, 1990 to Aurentz and entitled "Countersink forming tool;" U.S. Pat. No. 5,597,273 issued on Jan. 28, 1997 to Hirsch and entitled "Dual direction countersink;" U.S. Pat. No. 5,827,018 issued on Oct. 27, 1998 to Blankenship et al. and entitled, "Countersink cutters having a free-spinning pilot;" and U.S. Pat. No. 6,036,409 issued on Mar. 14, 2000 to Rissler and entitled "Blind hole self-collet countersink." All the patents cited herein are hereby incorporated by reference as if set forth in their entirety herein.

Some examples of high speed steel compositions that may possibly be used or adapted for use in at least one possible embodiment of the invention may be found in the following U.S. patents: U.S. Pat. No. 4,121,927 issued on Oct. 24, 1978 to Lohman et al. and entitled "Method of producing high carbon hard alloys;" U.S. Pat. No. 4,519,839 issued on May 28, 1985 to Toyoaki et al. and entitled "Sintered high vanadium high speed steel and method of making same;" U.S. Pat. No. 4,880,461 issued on Nov. 14, 1989 to Uchida and entitled "Super hard high-speed tool steel;" U.S. Pat. No. 5,578,773 issued on Nov. 26, 1996 to Wisell and entitled "High-speed steel manufactured by powder metallurgy;" U.S. Pat. No. 6,057,045 issued on May 2, 2000 to Wojcieszynski et al. and entitled "High-speed steel article;" and U.S. Pat. No. 6,200,528 issued on Mar. 13, 2001 to Rodney et al. and entitled "Cobalt free high speed steels." All the patents cited herein are hereby incorporated by reference as if set forth in their entirety herein.

All, or substantially all, of the components and methods of the various embodiments may be used with at least one embodiment or all of the embodiments, if more than one embodiment is described herein.

Some examples of hard metal materials that may possibly be used or adapted for use in at least one possible embodiment of the invention may be found in the following U.S. patents: U.S. Pat. No. 4,765,419 issued on Aug. 23, 1988 to Scholz et al. and entitled "Rock drill with cutting inserts;" U.S. Pat. No. 4,826,364 issued on May 2, 1989 to Grunsky and entitled "One-piece rotary material removing tool of sintered hard metal;" U.S. Pat. No. 4,861,673 issued on Aug. 29, 1989 to Hara et al. and entitled "Composite sintered material having sandwich structure;" U.S. Pat. No. 5,467,669 issued on Nov. 21, 1995 to Stroud and entitled "Cutting tool insert;" and U.S. Pat. No. 5,492,187 issued on Feb. 20, 1996 to Neukirchen et al. and entitled "Twist drill." All the patents cited herein are hereby incorporated by reference as if set forth in their entirety herein.

The abstract of the disclosure is submitted herewith as required by 37 C.F.R. §1.72(b). As stated in 37 C.F.R. §1.72(b): "A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims." Therefore, the abstract is not intended to limit the claims in any manner and should not be interpreted as limiting the claims in any manner.

Some examples of cermet materials that may possibly be used or adapted for use in at least one possible embodiment of the invention may be found in the following U.S. patents: U.S. Pat. No. 5,186,739 issued on Feb. 16, 1993 to Isobe et al. and entitled "Cermet alloy containing nitrogen;" U.S. Pat. No. 5,460,893 issued on Oct. 24, 1995 to Teruuchi et al. and entitled "Wear resistant titanium carbonitride-based cermet cutting insert;" U.S. Pat. No. 5,470,372 issued on Nov. 28, 1995 to Weinl and entitled "Sintered extremely fine-grained titanium-based carbonitride alloy with improved toughness and/or wear resistance;" U.S. Pat. No. 5,641,921 issued on Jun. 24, 1997 to Dennis et al. and entitled "Low temperature, low pressure, ductile, bonded cermet for enhanced abrasion and erosion performance;" U.S. Pat. No. 6,010,283 issued on Jan. 4, 2000 to Henrich et al. and entitled "Cutting insert of a cermet having a Co—Ni—Fe-binder;" U.S. Pat. No. 6,231,277 issued on May 15, 2001 to Abukawa and entitled "Cermet tool and method for manufacturing the same;" and U.S. Pat. No. 6,387,552 issued on May 14, 2002 to Iyori et al. and entitled "TiCN-based cermet." All the patents cited herein are hereby incorporated by reference as if set forth in their entirety herein.

All of the patents, patent applications and publications recited herein, and in the Declaration attached hereto, are hereby incorporated by reference as if set forth in their entirety herein.

Some examples of ceramic materials that may possibly be used or adapted for use in at least one possible embodiment of the invention may be found in the following U.S. patents: U.S. Pat. No. 5,641,251 issued on Jun. 24, 1997 to Leins et al. and entitled "All-ceramic drill bit;" U.S. Pat. No. 6,362,120 issued on Mar. 26, 2002 to Fukushima and entitled "Alumina ceramic composition;" U.S. Pat. No. 6,352,611 issued on Mar. 5, 2002 to Han et al. and entitled "Ceramic composition for an apparatus and method for processing a substrate;" U.S. Pat. No. 6,380,113 issued on Apr. 30, 2002 to Kim et al. and entitled "Tetragonal zirconia ceramic powders, Tetragonal zirconia-alumina composite using the ceramic powder and method of preparation for the same;" U.S. Pat. No. 6,395,396 issued on May 28, 2002 to Hanse and entitled "Thermal shock resistant ceramic article;" U.S. Pat. No. 6,402,991 issued on Jun. 11, 2002 to Itakura et al. and entitled "Shaped article made of functional material;" U.S. Pat. No. 6,440,243 issued on Aug. 27, 2002 to Tan et al. and entitled "Methods of forming ceramic composition;" and U.S. Pat. No. 6,469,278 issued on Oct. 22, 2002 to Boyce and entitled "Hardfacing having coated ceramic particles or coated particles of other hard materials." All the patents cited herein are hereby incorporated by reference as if set forth in their entirety herein.

The corresponding foreign patent application publications, namely, Federal Republic of Germany Patent Application No. DE 102 04 105, filed on Feb. 1, 2002, having inventor Herman F. PROKOP, and DE-OS 102 04 105 having inventor Herman F. PROKOP, and DE-PS 102 04 105 having inventor Herman F. PROKOP, as well as their published equivalents, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

Some examples of cubic boron nitride materials that may possibly be used or adapted for use in at least one possible embodiment of the invention may be found in the following U.S. patents: U.S. Pat. No. 4,255,165 issued on Mar. 10, 1981 to Dennis et al. and entitled "Composite compact of interleaved polycrystalline particles and cemented carbide masses;" U.S. Pat. No. 4,906,528 issued on Mar. 6, 1990 to Cercau et al. and entitled "Composite cutting element containing cubic boron nitride and method of making the same;" U.S. Pat. No. 5,062,865 issued on Nov. 5, 1991 to Chen et al. and entitled "Chemically bonded super abrasive grit;"

U.S. Pat. No. 5,273,557 issued on Dec. 28, 1993 to Cerutti et al. and entitled "Twist drills having thermally stable diamond or CBN compacts tips;" U.S. Pat. No. 5,711,702 issued on Jan. 27, 1998 to Devlin and entitled "Curve cutter with non-planar interface;" U.S. Pat. No. 6,454,027 issued on Sep. 24, 2002 to Fang et al. and entitled "Polycrystalline diamond carbide compositions." All the patents cited herein are hereby incorporated by reference as if set forth in their entirety herein.

Some examples of polycrystalline diamond materials that may possibly be used or adapted for use in at least one possible embodiment of the invention may be found in the following U.S. patents: U.S. Pat. No. 4,525,178 issued on Jun. 25, 1985 to Hall and entitled "Composite polycrystalline diamond;" U.S. Pat. No. 4,604,106 issued on Aug. 5, 1986 to Hall et al. and entitled "Composite polycrystalline diamond compact;" U.S. Pat. No. 4,608,226 issued on Aug. 26, 1986 to Lauvinerie et al. and entitled "Method of forming diamond tooth insert for a drill bit and a diamond cutting element formed thereby;" U.S. Pat. No. 4,943,488 issued on Jul. 24, 1990 to Sung et al. and entitled "Low pressure bonding of pcd bodies and method for drill bits and the like;" U.S. Pat. No. 6,029,544 issued on Feb. 29, 2000 to Katayama and entitled "Sintered diamond drill bits and method of making." All the patents cited herein are hereby incorporated by reference as if set forth in their entirety herein.

Some examples of titanium nitride coating of drills, features of which may possibly be used or adapted for use in at least one possible embodiment of the present invention may possibly be found in the following U.S. patents: U.S. Pat. No. 6,443,674 issued on Sep. 3, 2002 to Jaconi and entitled "Self-centering twist drill having a modified flat bottom section and a helical crown point tip;" U.S. Pat. No. 6,055,886 issued on May 2, 2000 to Tank et al. and entitled "Drill blank;" U.S. Pat. No. 5,641,251 issued on Jun. 24, 1997 to Leins et al. and entitled "All-ceramic drill bit;" U.S. Pat. No. 5,636,948 issued on Jun. 10, 1997 to Rexius and entitled "Drill for synthetic fiber filled plastic and like materials;" U.S. Pat. No. 4,704,055 issued on Nov. 3, 1987 to Guhring and entitled "Drill with cooling channel;" and U.S. Pat. No. 4,694,710 issued on Sep. 22, 1987 to Phall and entitled "Method of making a blank of a drill bit." All the patents cited herein are incorporated by reference as if fully set forth in their entirety herein.

The details in the patents, patent applications and publications may be considered to be incorporable, at Applicant's option, into the claims during prosecution as further limitations in the claims to patentably distinguish any amended claims from any applied prior art.

Some examples of injection molding of drills or drill components and metal parts, features of which may possibly be utilized or adapted for use in at least one possible embodiment of the present invention may possibly be found in the following U.S. patents: U.S. Pat. No. 5,971,673 issued on Oct. 26, 1999 to Berglund et al. and entitled "Two-piece rotary metal-cutting tool and method for interconnecting the pieces;" U.S. Pat. No. 5,988,953 issued on Nov. 23, 1999 to Berglund et al. and entitled "Two-piece rotary metal-cutting tool and method for interconnecting the pieces;" U.S. Pat. No. 6,056,915 issued on May 2, 2000 to Behi et al. and entitled "Rapid manufacture of metal and ceramic tooling;" U.S. Pat. No. 6,315,935 issued on Nov. 13, 2001 to Schoonover et al. and entitled "Low pressure injection molding of knife blades from metal feedstocks;" U.S. Pat. No. 6,428,595 issued on Aug. 6, 2002 to Hayashi et al. and entitled "Metal sintered body and production method thereof;" and U.S. Pat. No. 6,444,167 issued on Sep. 3, 2002 to Shimodaira et al. and entitled "Method of forming undercut in metal powder injection-molded article." All the patents cited herein are incorporated by reference as if fully set forth in their entirety herein.

It will be understood that the examples of patents, published patent applications, and other documents which are included in this application and which are referred to in paragraphs which state "Some examples of . . . which may possibly be used in at least one possible embodiment of the present invention . . . " may possibly not be used or useable in any one or more embodiment of the invention.

The sentence immediately above relates to patents, published patent applications and other documents either incorporated by reference or not incorporated by reference.

Some examples of sintering drills and drill components features of which may possibly be utilized or adapted for use in at least one possible embodiment of the present invention may possibly be found in the following U.S. patents: U.S. Pat. No. 4,704,055 issued on Nov. 3, 1987 to Guhring and entitled "Drill with cooling channel"; U.S. Pat. No. 4,713, 286 issued on Dec. 15, 1987 to Bunting et al. and entitled "Printed circuit board drill and method of manufacture;" U.S. Pat. No. 4,762,445 issued on Aug. 9, 1988 to Bunting et al. and entitled "Composite sintered twist drill;" U.S. Pat. No. 4,971,485 issued on Nov. 20, 1990 to Nomura et al. and entitled "Cemented carbide drill;" U.S. Pat. No. 6,027,808 issued on Feb. 22, 2000 to Aoki et al. and entitled "Cemented carbide for a drill, and for a drill forming holes in printed circuit boards which is made of the cemented carbide;" and U.S. Pat. No. 6,182,533 issued on Feb. 6, 2001 to Tank and entitled "Method of making a drill blank." All the patents cited herein are incorporated by reference as if fully set forth in their entirety herein.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents but also equivalent structures.

Some examples of grinding devices or grinding methods for use in grinding drills which may possibly be used in at least one possible embodiment of the present invention may possibly be found in the following U.S. patents: U.S. Pat. No. 6,431,962 issued on Aug. 13, 2002 to George and entitled "Method and apparatus for making a cutting tool having a flute"; U.S. Pat. No. 6,071,047 issued on Jun. 6, 2000 to Nakai and entitled, "Method and apparatus for feeding coolant liquid and separating and recovering it in cutting machine and grinding machine"; U.S. Pat. No. 5,735,732 issued on Apr. 7, 1998 to Bernard and entitled "Precision drill sharpener and grinding wheel assembly therefor"; U.S. Pat. No. 5,649,853 issued on Jul. 22, 1997 to Kuo and entitled "Drill bit grinding machine"; U.S. Pat. No. 5,311,703 issued on May 17, 1994 to Ketteringham and entitled "Multiple purpose tool grinding device"; U.S. Pat. No. 5,263,286 issued on Nov. 23, 1993 to Hosoi and entitled "Drill and drill grinding method and apparatus"; and U.S. Pat. No. 5,231,802 issued on Aug. 3, 1993 to Hosoi and entitled "Drill and drill grinding method and apparatus." All the patents cited herein are incorporated by reference as if fully set forth in their entirety herein.

Some examples of methods of producing a gash for a drill and gash formations for drill that may possibly be used or adapted for use in at least one possible embodiment of the invention may be found in the following U.S. patents: U.S. Pat. No. 4,470,733 issued on Sep. 11, 1984 to Marques, Jr. and entitled "Multiple function cutting tool;" U.S. Pat. No. 4,680,896 issued on Jul. 21, 1987 to Breitenstein et al. and entitled "Tool unloading mechanism for automatic tool grinding machine;" U.S. Pat. No. 5,173,014 issued on Dec. 22, 1992 to Agapiou and entitled Four flute center cutting drill;" U.S. Pat. No. 5,236,291 issued on Aug. 17, 1993 to Agapiou and entitled "Multi-tooth drill with improved chisel edge;" U.S. Pat. No. 5,467,670 issued on Nov. 21, 1995 to Alverio and entitled "Method of manufacture for rotary cutting tool;" and U.S. Pat. No. 5,855,458 issued on Jan. 5, 1999 to Reynolds et al. and entitled "Rotary cutter." All the patents cited herein are incorporated by reference as if fully set forth in their entirety herein.

The invention as described hereinabove in the context of the preferred embodiments is not to be taken as limited to all of the provided details thereof, since modifications and variations thereof may be made without departing from the spirit and scope of the invention.

At Least Partial Index of Reference Numerals

| | |
|---|---|
| 1 | Rotary cutting tool, drill |
| 2a, 2b | Main cutting edge, edge |
| 3 | Cutter portion |
| 4 | Tip |
| 5 | Flute |
| 6 | retaining portion |
| 7 | Cutting corner |
| 8a, 8b | Secondary cutting edge, smooth finishing cutting edge |
| 9 | Transition portion, introduction land |
| 10 | Curved portion |
| 11 | Smooth finishing region |
| 12 | Coolant channel |
| 13a, 13b | Secondary cutting edge, friction cutting, or reaming, edge |
| 14a, 14b | Cutting edge |
| 15 | Axial portion |
| 16 | Curved portion |
| 17 | Secondary free flank surface |
| 18 | Free flank surface edge, edge |
| α | Transition angle |
| β | Secondary cutting angle |
| HR | Radius of main cutting edge |
| M | Central axis |
| MR | Maximal cutting edge radius |
| R1, R2, R3 | Radius of curvature |

What is claimed is:

1. A rotary twist drill configured to drill a hole in an object to be drilled, said twist drill comprising:

a shaft portion configured to retain said drill for drilling;

a cutting portion disposed adjacent said shaft portion;

said shaft portion and said cutting portion defining a central longitudinal axis disposed through said shaft portion and said cutting portion;

said cutting portion comprising a tip portion and a fluted portion;

said tip portion being configured to cut a hole in an object;

said tip portion comprising at least one chisel edge;

said fluted portion being disposed between said tip portion and said shaft portion and having at least one helical chip flute disposed to curve helically about said central longitudinal axis;

said fluted portion comprising at least one helical land surface adjacent a corresponding helical chip flute;

said at least one helical land surface and its corresponding helical chip flute forming an edge, a portion of which is a cutting edge;

said cutting edge portion of said fluted portion being configured and disposed to further cut and enlarge the diameter of a hole cut by said tip portion, and to form a smoother finish on the interior surface of the hole than the finish formed by said tip portion;

said cutting edge portion of said fluted portion being configured and disposed to bulge outwardly in a radial direction away from said central longitudinal axis to form a bulge on said fluted portion which extends radially beyond said tip portion;

said cutting edge portion of said fluted portion comprising a first edge area, a second edge area, and a third edge area;

said first edge area being disposed at a first longitudinal distance measured along said central longitudinal axis from said tip portion;

said second edge area being disposed at a second longitudinal distance, greater than said first longitudinal distance, measured along said central longitudinal axis from said tip portion;

said third edge area being disposed at a third longitudinal distance, greater than said second longitudinal distance, measured along said central longitudinal axis from said tip portion;

said second edge area being disposed further away, measured radially from said central longitudinal axis, than all of: said first edge area, said third edge area, and said tip portion; and at least one of said first edge area and said second edge area comprising a curved portion having a curvature in addition to said helical curvature.

2. The rotary drill according to claim 1, wherein:

each of said first edge area, said second edge area, and said third edge area comprising a curved portion having a curvature in addition to said helical curvature.

3. The rotary drill according to claim 2, wherein one of (A) and (B):

(A) said edge of said fluted portion and a corresponding chisel edge together form a cutting corner; and said cutting corner defines an angle in the range of 140 degrees to 179 degrees; and (B) said edge of said fluted portion comprises an axial edge portion which is essentially equidistant from said central longitudinal axis along the entire length of said axial edge portion;

said axial edge portion being disposed between said cutting edge portion and a corresponding chisel edge;

said axial edge portion and said corresponding chisel edge form a cutting corner;

said cutting corner defines an angle in the range of 110 degrees to 121 degrees; and said axial edge portion is shorter in length than the radial distance of an outermost point on said cutting edge portion measured radially from said central longitudinal axis.

4. A rotary cutting tool comprising:

a cutting portion;

said cutting portion comprising a tip portion and a fluted portion;

said tip portion being configured to cut an orifice having a first diameter in an object to be cut;

said cutting portion defining a central longitudinal axis disposed through said cutting portion;

said fluted portion comprising a cutting edge configured to cut an orifice having a final diameter; said final diameter orifice being greater than said first diameter orifice cut by said tip portion of said rotary cutting tool;

said fluted cutting edge comprising a first edge portion and a second edge portion;

said first edge portion comprising a first edge area, a second edge area, and a third edge area;

said first edge area being disposed at a first longitudinal distance measured along said central longitudinal axis from said tip portion;

said second edge area being disposed at a second longitudinal distance measured along said central longitudinal axis from said tip portion;

said third edge area being disposed at a third longitudinal distance measured along said central longitudinal axis from said tip portion;

said second longitudinal distance being greater than said first longitudinal distance;

said third longitudinal distance being greater than said second longitudinal distance;

said first edge area being disposed at a first radial distance from said central longitudinal axis;

said first radial distance being measured radially from said central longitudinal axis;

said second edge area being disposed at a second radial distance from said central longitudinal axis;

said second radial distance being measured radially from said central longitudinal axis;

said third edge area being disposed at a third radial distance from said central longitudinal axis;

said third radial distance being measured radially from said central longitudinal axis;

said tip portion comprising a peripheral area; said peripheral area being disposed at a radial distance (HR) being measured radially from said central longitudinal axis;

said second radial distance (MR), of said second edge area, being greater than all of (i), (ii), and (iii), wherein (i), (ii), and (iii) are:

(i) said first radial distance, of said first edge area;

(ii) said third radial distance, of said third edge area; and (iii) said radial distance (HR), of said tip portion;

said first edge area having a first length measured along said central longitudinal axis;

said second edge area having a second length measured along said central longitudinal axis;

said third edge portion having a third length measured along said central longitudinal axis;

the sum of the lengths of said first edge area, said second edge area, and said third edge area being substantially greater than the difference between said second radial distance (MR), of said second edge area, and said radial distance (HR), of said tip portion; and wherein said rotary cutting tool has at least two cutting edges that respectively comprise a main cutting edge and that respectively are disposed symmetrically with respect to the central axis (M) of a cutter portion, whereby the radius (HR) of the main cutting edges is less than the maximal cutting edge radius (MR) of the cutter portion; at least one secondary cutting edge is associated with a main cutting edge, said secondary cutting edge is curvilinear in at least a portion and is configured as smooth finishing cutting edge, said secondary cutting edge comprises a plurality of curve-forming radii (R1,R2,R3), whereby in an outer smooth finishing region within the region of the maximal cutting edge radius (MR), the curve-forming radius (R2) of the smooth finishing cutting edge is at least as large as the maximal cutting edge radius (MR); the cutter portion that is adjacent to the outer smooth finishing region is tapered to be diminished in size in the direction away from the main cutting edges.

5. The rotary cutting tool according to claim 4, characterized in that each smooth finishing cutting edge associated with one main cutting edge is adjacent to a cutting corner, by way of a transition angle (α') of at least 140 degrees and maximally 179 degrees, at an edge.

6. The rotary cutting tool according to claim 4, characterized by an axial region of a cutting edge, said axial region being disposed adjacent to the associated main cutting edge and essentially parallel to the central axis (M).

7. The rotary cutting tool according to claim 6, characterized in that the angle of transition (α) between the main cutting edge and the adjacent axial region is at least 110 degrees and maximally 121 degrees.

8. The rotary cutting tool according to claim 7, characterized in that the length (L) of the axial region is less than the maximal cutting edge radius (MR).

9. The rotary cutting tool according to claim 8, wherein:

the secondary cutting edge embraces, together with the central axis (M), a maximal secondary cutting angle (β) of at least 30 degrees and maximally 60 degrees;

the radius (HR) of the main cutting edge is at least 90% and maximally 98% of the maximal cutting edge radius (MR);

a secondary cutting edge is configured as friction cutting or reaming edge without contiguous main cutting edge, and that this friction cutting or reaming edge determines, as smooth finishing cutting edge, the maximal cutting edge radius (MR);

one secondary cutting edge in the region of the maximal cutting edge radius (MR) is straight;

one of the secondary cutting edges (8a,8b,13a,13b) is made of one of:
polycrystalline diamond (PCD);
cubic boron nitrite or cubic boron nitride (CBN); and
ceramic;

one of: at least one main cutting edge and at least one secondary cutting edge is held on a base body; and the base body comprises cermet.

10. The rotary drill according to claim 3, wherein:

said edge of said fluted portion comprises a fourth edge area disposed at a fourth longitudinal distance, less than said first longitudinal distance, measured along said central longitudinal axis from said tip portion;

said first edge area being disposed further away, measured radially from said central longitudinal axis, than said fourth edge area;

said fourth edge area comprises a point at which a tangent thereto and a line parallel to said central longitudinal axis intersect and form a cutting angle in the range of 30 degrees to 60 degrees;

said second edge area comprises a point which, measured radially from said central longitudinal axis, is the outermost point of the exterior surface of said fluted portion;

the distance measured radially from said central longitudinal axis to the outermost point of the exterior surface of said fluted portion is the maximum cutting edge radius;

the radius of said tip portion is a percentage of the maximum cutting edge radius, which percentage is in the range of 90% to 98%;

said cutting edge portion of said fluted portion is made of one of:
polycrystalline diamond (PCD);
cubic boron nitrite or cubic boron nitride (CBN); and
ceramic;

one of: said at least one chisel edge and said cutting edge portion of said fluted portion is held on a base body; and said base body comprises cermet.

11. A rotary drill bit configured to drill a hole in an object to be drilled, said drill bit having a central longitudinal axis and comprising:

a tip portion being configured to cut a hole in an object;

said tip portion comprising at least one chisel edge;

a fluted portion having at least one chip flute disposed along said central longitudinal axis;

said fluted portion comprising at least one land surface adjacent said at least one chip flute;

said at least one land surface and its corresponding chip flute forming an edge, a portion of which is a cutting edge;

said cutting edge portion of said fluted portion being configured and disposed to further cut and enlarge the diameter of a hole cut by said tip portion, and to form a smoother finish on the interior surface of the hole than the finish formed by said tip portion;

said cutting edge portion of said fluted portion being configured and disposed to bulge outwardly in a radial direction away from said central longitudinal axis to form a bulge on said fluted portion, which bulge extends radially beyond said tip portion;

said cutting edge portion of said fluted portion comprising at least one outwardly curved and convex finishing portion; and said cutting edge portion comprising a point which, measured radially from said central longitudinal axis, is the outermost point of the exterior surface of said fluted portion.

12. The rotary drill bit according to claim 11, wherein:

said edge of said fluted portion and a corresponding chisel edge together form a cutting corner; and said cutting corner defines an angle in the range of 140 degrees to 179 degrees.

13. The rotary drill bit according to claim 12, wherein said cutting edge portion comprises a point at which a tangent thereto and a line parallel to said central longitudinal axis intersect and form a cutting angle in the range of 30 degrees to 60 degrees.

14. The rotary drill bit according to claim 13, wherein the distance measured radially from said central longitudinal axis to the outermost point of the exterior surface of said fluted portion is the maximum cutting edge radius; and the radius of said tip portion is a percentage of the maximum cutting edge radius, which percentage is in the range of 90% to 98%.

15. The rotary drill bit according to claim 14, wherein:

said cutting edge portion is made of one of:
polycrystalline diamond (PCD);
cubic boron nitrite or cubic boron nitride (CBN); and
ceramic;

one of: said at least one chisel edge and said cutting edge portion of said fluted portion is held on a base body;

said base body comprises cermet; and said at least one chip flute comprises one of: at least one straight chip flute and at least one helical chip flute.

16. The rotary drill according to claim 11, wherein:

said edge of said fluted portion comprises an axial edge portion which is essentially equidistant from said central longitudinal axis along the entire length of said axial edge portion; and said axial edge portion being disposed between said cutting edge portion and a corresponding chisel edge.

17. The rotary drill according to claim 16, wherein:

said axial edge portion and said corresponding chisel edge form a cutting corner;

said cutting corner defines an angle in the range of 110 degrees to 121 degrees; and said axial edge portion is shorter in length than the radial distance of an outermost point on said cutting edge portion measured radially from said central longitudinal axis.

18. The rotary drill bit according to claim 17, wherein said cutting edge portion comprises a point at which a tangent thereto and a line parallel to said central longitudinal axis intersect and form a cutting angle in the range of 30 degrees to 60 degrees.

19. The rotary drill bit according to claim 18, wherein the distance measured radially from said central longitudinal axis to the outermost point of the exterior surface of said fluted portion is the maximum cutting edge radius; and the radius of said tip portion is a percentage of the maximum cutting edge radius, which percentage is in the range of 90% to 98%.

20. The rotary drill bit according to claim 19, wherein:

said cutting edge portion is made of one of:
polycrystalline diamond (PCD);
cubic boron nitrite or cubic boron nitride (CBN); and
ceramic;

one of: said at least one chisel edge and said cutting edge portion of said fluted portion is held on a base body;

said base body comprises cermet; and said at least one chip flute comprises one of: at least one straight chip flute and at least one helical chip flute.

* * * * *